US009925457B2

(12) United States Patent
Gassoway et al.

(10) Patent No.: US 9,925,457 B2
(45) Date of Patent: Mar. 27, 2018

(54) USER-REPLACEABLE THUMBSTICK TOP FOR GAME CONTROLLER

(71) Applicant: Microsoft Technology Licensing, LLC, Redmond, WA (US)

(72) Inventors: Gabriel M. R. Gassoway, Issaquah, WA (US); Jason V. Tsai, Bellevue, WA (US); Kenneth D. Jasinski, Seattle, WA (US); Jonathan S. Robinson, Kirkland, WA (US); Christopher H. Kujawski, Seattle, WA (US); Aaron Schmitz, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 358 days.

(21) Appl. No.: 14/734,978

(22) Filed: Jun. 9, 2015

(65) Prior Publication Data

US 2016/0361636 A1    Dec. 15, 2016

(51) Int. Cl.
  *A63F 13/24*    (2014.01)
  *A63F 9/24*    (2006.01)
  *A63F 13/98*    (2014.01)

(52) U.S. Cl.
  CPC .............. *A63F 13/24* (2014.09); *A63F 9/24* (2013.01); *A63F 13/98* (2014.09); *A63F 2009/2407* (2013.01); *A63F 2009/2483* (2013.01)

(58) Field of Classification Search
  None
  See application file for complete search history.

(56) References Cited

U.S. PATENT DOCUMENTS

| | | | |
|---|---|---|---|
| 5,607,158 A * | 3/1997 | Chan | A63F 13/06 273/148 B |
| 5,615,083 A | 3/1997 | Burnett | |
| 5,883,690 A * | 3/1999 | Meyers | A63F 13/02 345/157 |
| 5,995,034 A | 11/1999 | Liu | |
| 6,752,719 B2 | 6/2004 | Himoto et al. | |
| 8,678,927 B2 | 3/2014 | Hammontree et al. | |
| 2004/0222970 A1 | 11/2004 | Martinez et al. | |
| 2009/0139360 A1 | 6/2009 | Diccion | |

(Continued)

OTHER PUBLICATIONS

"International Preliminary Report on Patentability Issued in PCT Application No. PCT/US2016/034209", dated Feb. 17, 2017, 6 Pages.

(Continued)

*Primary Examiner* — Jason Yen
(74) *Attorney, Agent, or Firm* — Fiala & Weaver P.L.L.C.

(57) ABSTRACT

A user-replaceable thumbstick top for a user input device is described. The thumbstick top comprises one or more first mating elements that are adapted to mate with one or more second mating elements of a thumbstick base of the user input device. The first and second mating elements are configured to enable the thumbstick top to be removably connected to the thumbstick base. The manner of interconnection between the thumbstick top and the thumbstick base is such that a user can connect and disconnect the two components without having to disassemble the game controller and without having to use any tools.

28 Claims, 24 Drawing Sheets

(56) References Cited

U.S. PATENT DOCUMENTS

| | | | | |
|---|---|---|---|---|
| 2009/0239665 | A1* | 9/2009 | Minuto | A63F 13/08 |
| | | | | 463/38 |
| 2011/0241992 | A1* | 10/2011 | Jameson | G05G 9/047 |
| | | | | 345/161 |
| 2012/0274563 | A1* | 11/2012 | Olsson | G05G 9/047 |
| | | | | 345/161 |
| 2012/0309261 | A1 | 12/2012 | Boman et al. | |
| 2013/0249830 | A1 | 9/2013 | Quek | |

OTHER PUBLICATIONS

"International Search Report and Written Opinion Issued in PCT Application No. PCT/US2016/034209", dated Aug. 4, 2016, 10 Pages.

"ScufGaming", Retrieved on: Feb. 2, 2015, Available at: <http://scufgaming.com/controllers/scuf-one-xbox-one/features/>, 18 pages.

King, Ashley, "Nintendo Patent Shows device with Interchangeable Controls", Published on: May 1, 2014, Available at: <http://wii-udaily.com/2014/05/nintendo-patent-shows-device-with-interchangeable-controls/>, 12 pages.

Stilphen, Scott, "Atari VCS/2600 Controllers", Published on: Jun. 19, 2014, Available at: <http://www.2600connection.com/faq/controllers/faq_controllers.html>, 218 pages.

"Second Written Opinion Issued in PCT Application No. PCT/US2016/034209", dated Dec. 7, 2016, 6 Pages.

* cited by examiner

USER-REPLACEABLE THUMBSTICK TOP FOR GAME CONTROLLER

BACKGROUND

A game controller is a type of input device that is designed to facilitate user interaction with a video game or other application executing on a computer, video game console, or other platform. For example, a game controller may provide a means by which a user can control a character or object within a video game. A variety of different types of game controllers exist and each game controller type may include one or more user-actuatable control elements via which a user can provide input. For example, a conventional game controller that is designed to be held in two hands (sometimes referred to as a "gamepad," "control pad," or "joypad") may include one or more user-actuatable buttons, triggers, thumbsticks, directional pads, touch pads, and the like. Each of these control elements may be manipulated by a user to generate various control signals for interacting with a video game or other application.

SUMMARY

A user-replaceable thumbstick top for a user input device (e.g., a game controller) is described herein. The thumbstick top comprises one or more first mating elements that are adapted to mate with one or more second mating elements of a thumbstick base of the user input device. The first and second mating elements are configured to enable the thumbstick top to be removably connected to the thumbstick base. The manner of interconnection between the thumbstick top and the thumbstick base is such that a user can connect and disconnect the two components without having to disassemble the game controller and without having to use any tools. Since the thumbstick top is user-replaceable, in embodiments, a user can connect different thumbstick tops to the same game controller so as to achieve a desired thumbstick shape, appearance, or other characteristic. Also, since the thumbstick top is user-replaceable, the user easily can replace a worn or broken thumbstick top with a new one.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the claimed subject matter is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the application and, together with the description, further serve to explain the principles of the embodiments and to enable a person skilled in the relevant art(s) to make and use the embodiments.

Figure 1:
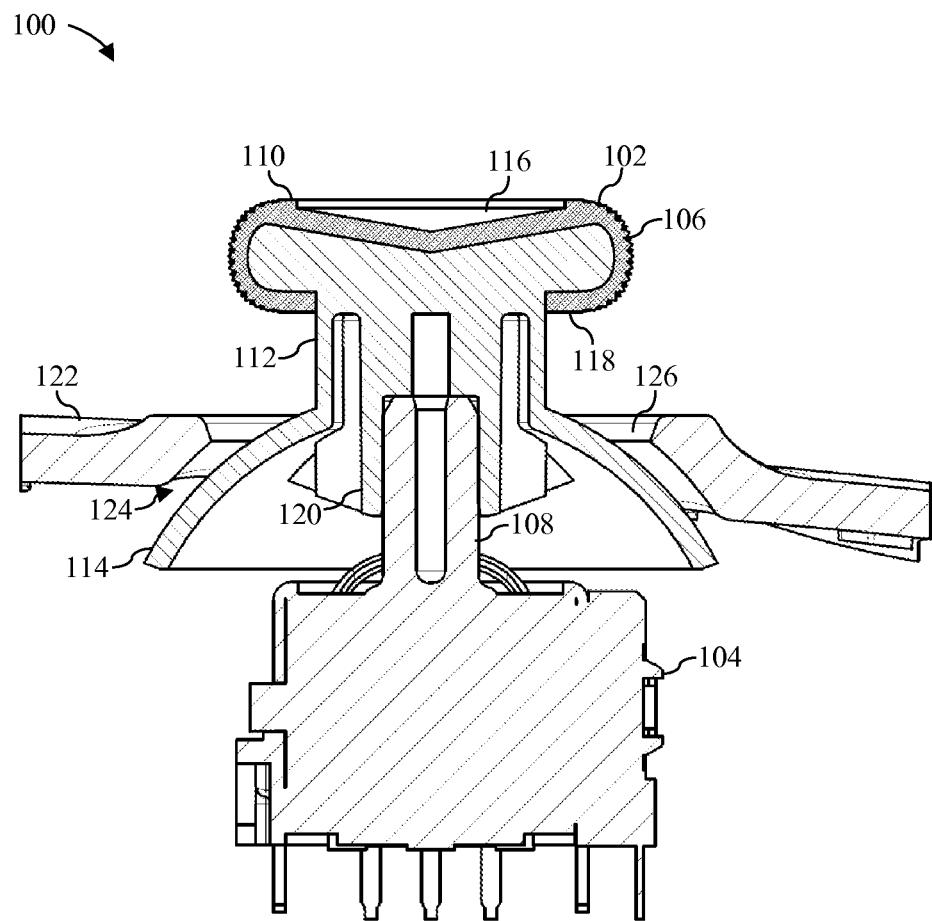
FIG. 1 shows a cross-sectional view of a portion of a conventional game controller that includes a thumbstick.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element is first identified is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

A game controller is a type of input device that is designed to facilitate user interaction with a video game or other application executing on a computer, video game console, or other platform. For example, a game controller may provide a means by which a user can control a character or object within a video game. A variety of different types of game controllers exist and each game controller type may include one or more user-actuatable control elements via which a user can provide input. For example, a conventional game controller that is designed to be held in two hands (sometimes referred to as a "gamepad," "control pad," or "joypad") may include one or more user-actuatable buttons, triggers, thumbsticks, directional pads, touch pads, and the like. Each of these control elements may be manipulated by a user to generate various control signals for interacting with a video game.

As noted above, some game controllers include at least one thumbstick. A thumbstick (which may also be referred to as an "analog thumbstick," "analog stick," "joystick," "control stick," or simply a "stick") is a game controller component that can be manipulated by a user to generate two-dimensional input for controlling or otherwise interacting with a video game or other application.

By way of example, FIG. 1 shows a cross-sectional view of a portion of a conventional game controller 100 that includes a thumbstick 102. Thumbstick 102 comprises a thumbstick module 104 and a thumbstick cap 106 that is attached thereto. Thumbstick module 104 is an electronic component that is mounted on a printed circuit board (not shown in FIG. 1) that is disposed within a housing of game controller 100. Thumbstick module 104 includes a moveable post 108 and a plurality of sensors in the form of potentiometers. The potentiometers utilize continuous electrical activity to generate an analog input control signal based on a position of moveable post 108 in relation to a default "center" position.

Thumbstick cap 106 comprises a generally disk-shaped top 110 that is connected to a dome-shaped base 114 via a cylindrical stem 112. Top 110 includes a first surface 116 and an opposing second surface 118. First surface 116 is adapted to be manipulated by a user's finger (e.g., a user's thumb) and in this example is concave in shape. Thumbstick cap 106 also includes a connector 120 that extends perpendicularly from second surface 118 into a space defined by stem 112 and base 114. Connector 120 defines a cavity into which post 108 is inserted, thereby mounting thumbstick cap 106 on thumbstick module 104. By manipulating top 110 of thumbstick cap 106, a user can cause post 108 to deviate from its default "center" position, thereby generating a two-dimensional analog input control signal. Post 108 is biased such that when there is no force being applied, post 108 will revert the default "center" position.

As further shown in FIG. 1, the housing of game controller 100 includes a top case 122. Top case 122 includes a generally conical or volcano-shaped portion that surrounds an aperture 124. Top 110 and stem 112 of thumbstick cap 106 extend outside of the housing of game controller 100 via aperture 124, and are thus accessible for user manipulation. A portion of base 114 of thumbstick cap 106 is also externally exposed via aperture 124. An edge 126 of top case 122 that surrounds aperture 124 limits the degree to which a user can displace thumbstick cap 106 in any given direction since, at a certain degree of displacement, stem 112 of thumbstick cap 106 will collide with edge 126. Dome-shaped base 114 of thumbstick cap 106 is sized such that, no matter what the degree or direction of displacement of thumbstick cap 106, the interior of the housing of game controller 100 will not be exposed via aperture 124.

One issue with conventional game controller 100 is that the shape of thumbstick cap 106 may not be preferred by some users. For example, a user may prefer a thumbstick cap that has a stem that is longer than stem 112, so that the thumbstick cap is taller (i.e., extends further away from top case 122). As another example, a user may prefer a thumbstick cap that has a top with a convex or dome-shaped surface for finger interaction as opposed to concave-shaped first surface 116. Any of a wide variety of other thumbstick cap shapes may be preferred by different users for different reasons. Furthermore, a single user may prefer different types of thumbstick cap shapes for different types of video games.

With the conventional implementation shown in FIG. 1, the user is essentially stuck with thumbstick cap 106. If the user wants a thumbstick cap with a different shape, the user has very limited options. If other game controllers exist that are compatible with the user's video gaming platform and have thumbstick caps with the desired shape, then the user can choose to buy a new game controller entirely. This is a very expensive proposition for the user. Moreover, such other game controllers may not exist. It is also possible that some third parties may manufacture and/or sell replacement thumbstick caps for game controller 100 that have different shapes than thumbstick cap 106. Such replacement caps can either be installed by the third party or provided to the user as part of a do-it-yourself kit. In either case, the installation of the replacement thumbstick cap will involve disassembling and reassembling game controller 100 using one or more tools, since the housing of game controller 100 must be opened up to carry out the installation. Such disassembly and reassembly may be difficult, time-consuming, and result in damage to game controller 100 if not carried out properly.

A related issue associated with conventional game controller 100 arises when thumbstick cap 106 is worn or broken and thus needs replacing. Again, the user's options are very limited. The user can buy a new game controller entirely, which is expensive. Alternatively, the user can install or have installed a replacement thumbstick cap, wherein such replacement will necessarily involve disassembling and reassembling game controller 100. As noted above, such disassembly and reassembly may be difficult, time-consuming, and result in damage to game controller 100 if not carried out properly.

Embodiments described herein help address one or more of the foregoing issues. For example, embodiments described herein provide a thumbstick for a user input device, such as a game controller, that includes a thumbstick module and a thumbstick cap that is connected thereto. The thumbstick cap includes a thumbstick base that is mounted upon the thumbstick module and a thumbstick top that can be removably connected to the thumbstick base. The manner of interconnection between the thumbstick top and the thumbstick base is such that a user can connect and disconnect the two components without having to disassemble the game controller and without having to use any tools.

In an embodiment, a plurality of differently-shaped thumbstick tops may be provided, each of which can engage with the thumbstick base in a substantially similar manner. Such an embodiment enables a user to easily customize the thumbstick cap to achieve a desired shape. Thus, for example, a user may select a thumbstick top from among a plurality of thumbstick tops having stems of varying lengths in order to achieve a desired thumbstick height. As another example, a user may select a thumbstick top from among a plurality of thumbstick tops having differently-shaped surfaces for finger interaction (e.g., concave, convex or flat). A wide variety of differently-shaped thumbstick tops may be provided to facilitate a high level of user customization. Such customization can be achieved by the user at any time after the user has purchased the game controller. Since the thumbstick tops can be connected to and disconnected from the thumbstick base without the use of tools, the user can carry out such customization quickly and easily.

In accordance with the foregoing embodiment, the user can improve his or her gaming experience by modifying the thumbstick cap to obtain a preferred shape thereof. The user's preference in this regard may be a general preference or a preference that is based on a particular video game that the user intends to play. In further accordance with the foregoing embodiment, different users of the same game controller may modify the thumbstick cap thereof to suit their own personal shape preferences prior to use.

In a further embodiment, a plurality of thumbstick tops having different aesthetic appearances may be provided, each of which can engage with the thumbstick base in a substantially similar manner. Such an embodiment enables a user to easily customize the thumbstick cap to achieve a desired aesthetic appearance. Thus, for example, a user may select a thumbstick top of a particular color from among a plurality of different-colored thumbstick tops. As another example, a user may select a thumbstick top that has a desired logo, image, text, or other design formed thereon. A logo, image, text or other design may be formed on a thumbstick top via molding, printing, etching, engraving, stamping, or other suitable technique. A wide variety of thumbstick tops having different appearances may be provided to facilitate a high level of user customization.

Still further customization beyond shape and aesthetic appearance may be achieved by utilizing the user-replaceable thumbstick tops described herein. For example, a user may select from among thumbstick tops that are made of different materials (e.g., different plastics and/or metals) and from among thumbstick tops that have different surfaces (e.g., smooth or rough).

An additional advantage associated with the use of the aforementioned user-replaceable thumbstick tops is that a user can replace a worn or broken thumbstick top with a new one without having to replace a game controller and without having to take the game controller apart and put it back together again.

In the following sections, various embodiments of a user input device that includes a user-replaceable thumbstick top will be more fully described. In particular, Section II describes various example game controllers and user-replaceable thumbstick tops that may be connected thereto. Section III describes some additional exemplary embodiments. Section IV provides some concluding remarks.

Figure 2:
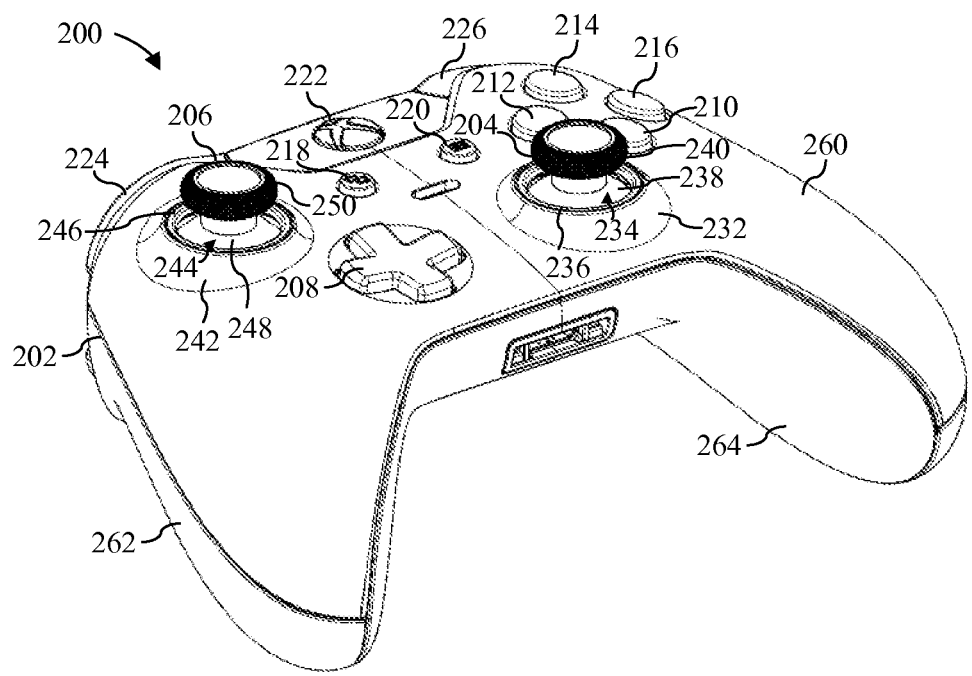
FIG. 2 shows a perspective view of a game controller in accordance with an embodiment that includes two thumbsticks, each of which comprises a user-replaceable thumbstick top.
Figure 3:
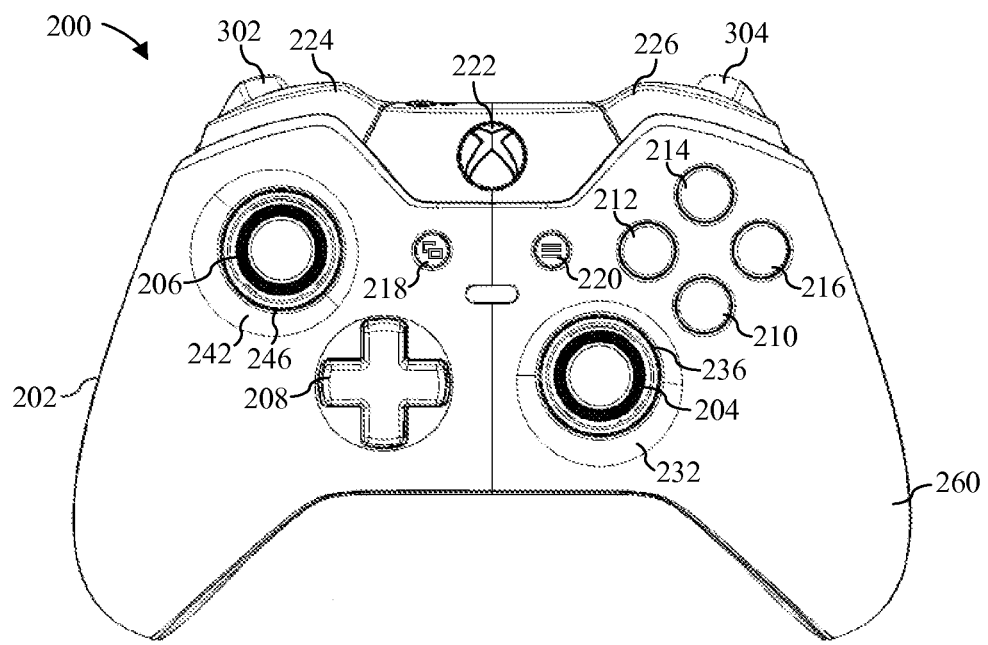
FIG. 3 shows a top view of the game controller of FIG. 2.

II. Example Game Controllers and User-Replaceable Thumbstick Tops that May be Connected Thereto FIG. 2 shows a perspective view of an example game controller 200 in accordance with an embodiment that includes two thumbsticks, each of which comprises a user-replaceable thumbstick top. FIG. 3 shows a top view of game controller 200. As shown in these figures, game controller 200 comprise a housing 202 that includes a number of mechanically interconnected components, including a top case 260, a bottom case 264 and a bottom trim component 262, that together define a cavity in which various internal components of game controller 200 are disposed. In an embodiment, each of the aforementioned components of housing 202 is formed from a thermoplastic material, such as PC/ABS (a compounded blend of polycarbonate (PC) and acrylonitrile butadiene styrene (ABS)). However, this example is not intended to be limiting, and the components of housing 202 may be formed from other materials as well.

Housing 202 includes a plurality of apertures via which various user-actuatable control elements of game controller 200 are exposed to and rendered manipulable by a user. The user-actuatable control elements of game controller 200 include a right thumbstick cap 204, a left thumbstick cap 206, a directional pad (D-pad) 208, a plurality of face buttons 210, 212, 214, 216, 218, 220 and 222, a left bumper button 224, a right bumper button 226, a left trigger 302, and a right trigger 304. Generally speaking, each of these user-actuatable control elements is connected to one or more sensors disposed within game controller 200. Such sensor(s) operate to detect when a user has interacted with a particular user-actuatable control element. Electronic circuitry disposed within game controller 200 operates to convert data generated by such sensors into user input control signals that may then be transmitted via a wired or wireless communication medium to a computer, game console, or other platform, where such user input control signals may be used to control a video game or other application. In embodiments, some or all of the aforementioned sensors and electronic circuitry are disposed on a printed circuit board that is disposed internal to housing 202.

Right thumbstick cap 204 extends from top case 260 via an aperture 234 defined therein. Aperture 234 is surrounded by an edge 236 and a generally conical or volcano-shaped portion 232 of top case 260. During user manipulation of right thumbstick cap 204, edge 236 limits the degree to which a user can displace right thumbstick cap 204 in any direction since, at a certain degree of displacement, a stem of right thumbstick cap 204 will collide with edge 236.

Right thumbstick cap 204 comprises a thumbstick base 238 and a thumbstick top 240. In FIGS. 2 and 3, thumbstick top 240 is removably connected to thumbstick base 238. In this connected state, a user may interact with thumbstick top 240 (e.g., by using his finger to manipulate thumbstick top 240) to cause displacement of right thumbstick cap 204. As will be described herein, thumbstick base 238 and thumbstick top 240 are designed in such a manner that a user of game controller 200 can disconnect thumbstick top 240 from thumbstick base 238 without having to disassemble game controller 200 and without having to use any tools.

Left thumbstick cap 206 extends from top case 260 via an aperture 244 defined therein. Aperture 244 is surrounded by an edge 246 and a generally conical or volcano-shaped portion 242 of top case 260. During user manipulation of left thumbstick cap 206, edge 246 limits the degree to which a user can displace left thumbstick cap 206 in any direction since, at a certain degree of displacement, a stem of left thumbstick cap 206 will collide with edge 246.

Left thumbstick cap 206 comprises a thumbstick base 248 and a thumbstick top 250. In FIGS. 2 and 3, thumbstick top 250 is removably connected to thumbstick base 248. In this connected state, a user may interact with thumbstick top 250 (e.g., by using his finger to manipulate thumbstick top 250) to cause displacement of left thumbstick cap 206. As will be described herein, thumbstick base 248 and thumbstick top 250 are designed in such a manner that a user of game controller 200 can disconnect thumbstick top 250 from thumbstick base 248 without having to disassemble game controller 200 and without having to use any tools.

Figure 4:
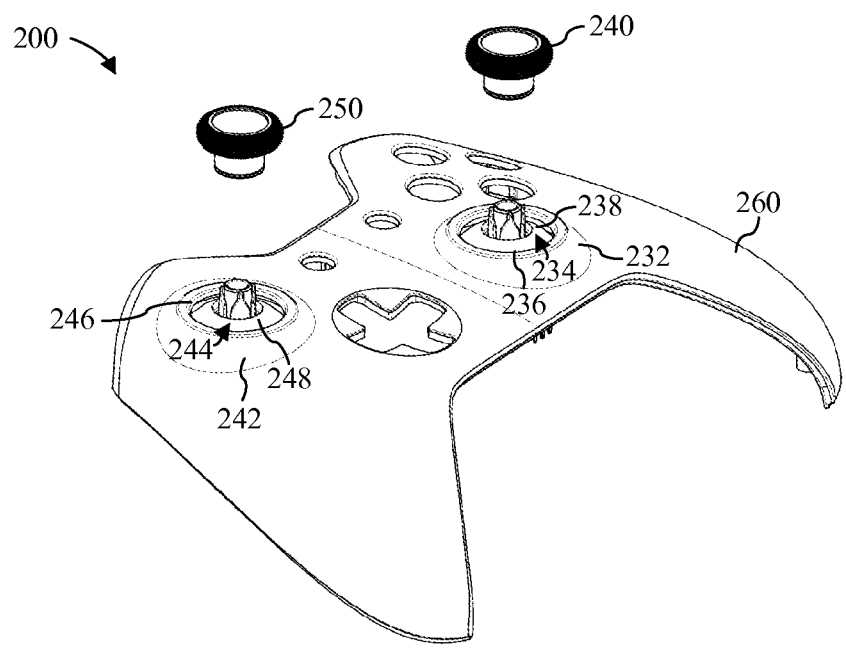
FIG. 4 shows a perspective view of a portion of the game controller of FIG. 2 that includes a top case, a right thumbstick cap, and a left thumbstick cap, wherein a top of each thumbstick cap is disconnected from a base thereof.

FIG. 4 shows a perspective view of a portion of game controller 200 that includes top case 260, right thumbstick cap 204 (which is comprised of thumbstick base 238 and thumbstick top 240) and left thumbstick cap 206 (which is comprised of thumbstick base 248 and thumbstick top 250). As shown in FIG. 4, thumbstick top 240 of right thumbstick cap 204 is disconnected from thumbstick base 238 of right thumbstick cap 204. A portion of thumbstick base 238 to which thumbstick top 240 may be removably connected is externally accessible with respect to housing 202 through aperture 234. In this disconnected state, a user of game controller 200 can replace thumbstick top 240 with another thumbstick top that uses an interconnect mechanism that is substantially similar to that used to connect thumbstick top 240 to thumbstick base 238. In this disconnected state, a user of game controller 200 can also reconnect thumbstick top 240 to thumbstick base 238.

As further shown in FIG. 4, thumbstick top 250 of left thumbstick cap 206 is disconnected from thumbstick base 248 of left thumbstick cap 206. A portion of thumbstick base 248 to which thumbstick top 250 may be removably connected is externally accessible with respect to housing 202 through aperture 244. In this disconnected state, a user of game controller 200 can replace thumbstick top 250 with another thumbstick top that uses an interconnect mechanism that is substantially similar to that used to connect thumbstick top 250 to thumbstick base 248. In this disconnected state, a user of game controller 200 can also reconnect thumbstick top 250 to thumbstick base 248.

Figure 5:
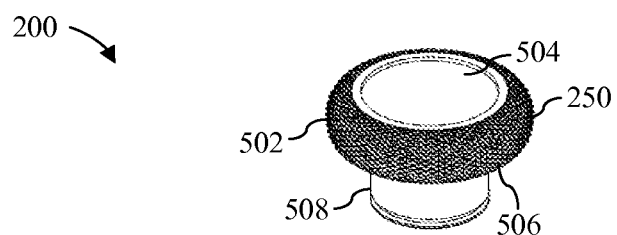
FIG. 5 shows a perspective view of a portion of the game controller of FIG. 2 that includes a portion of the top case, the left thumbstick cap, and a left thumbstick module, wherein the top of the left thumbstick cap is disconnected from the base thereof.
Figure 5:
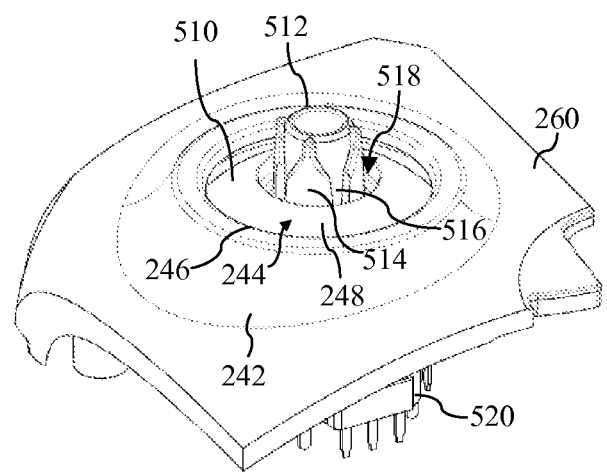

FIG. 5 shows a perspective view of a portion of game controller 200 that includes a portion of top case 260, left thumbstick cap 206 (which is comprised of thumbstick base 248 and thumbstick top 250), and a left thumbstick module 520 to which thumbstick base 248 is connected. As was the case with FIG. 4, thumbstick top 250 of left thumbstick cap 206 is disconnected from thumbstick base 248 of left thumbstick cap 206. Additional details concerning thumbstick base 248 and thumbstick top 250 will now be provided in reference to FIG. 5.

As shown in FIG. 5, thumbstick base 248 comprises a dome-shaped component 510 that includes a cylindrical post 512 that extends perpendicularly from a top surface thereof. A circular depression 518 is formed in the top surface of dome-shaped component 510 and surrounds cylindrical post 512. Cylindrical post 512 is also surrounded by four protrusions that extend therefrom and that define four tapered channels around an exterior wall thereof. A representative protrusion 514 and a representative tapered channel 516 are indicated in FIG. 5.

As further shown in FIG. 5, thumbstick top 250 comprises a head 502 and a cylindrical stem 508 that is connected thereto. Head 502 includes a first surface 504 and an opposing second surface 506. First surface 504 is adapted to be manipulated by a user's finger (e.g., a user's thumb) and in this example is concave in shape. Stem 508 extends perpendicularly from second surface 506.

Figure 6:
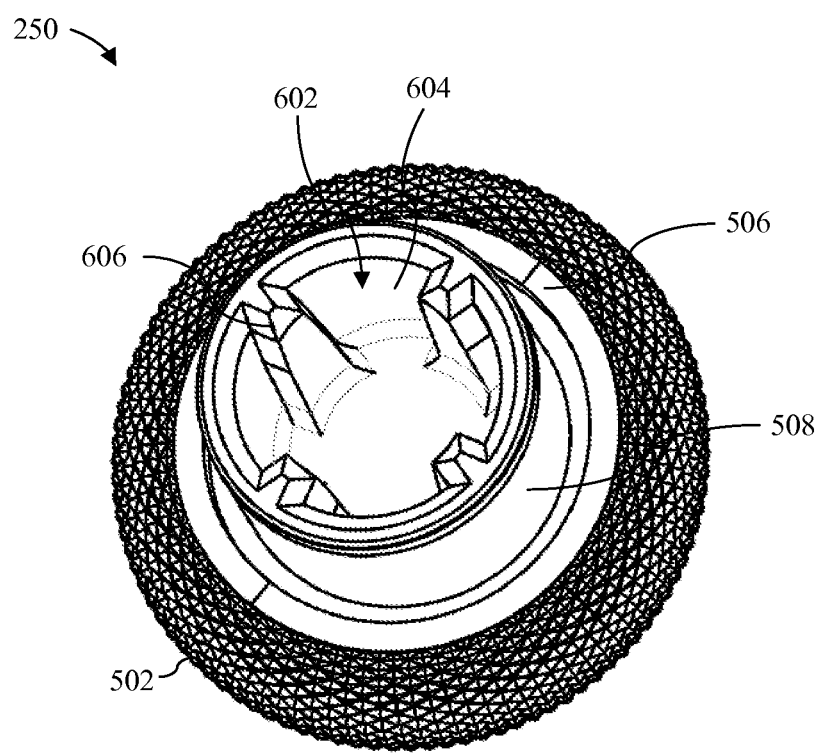
FIG. 6 shows a perspective view of the top of the left thumbstick cap of the game controller of FIG. 2.

FIG. 6 shows a perspective view of thumbstick top 250 that reveals additional features thereof. As shown in FIG. 6, stem 508 defines a generally cylindrical cavity 602 that is open on one end—namely, the end that is opposite to second surface 506 of head 502. An inner wall 604 of stem 508 surrounds cavity 602. Four wedge-shaped protrusions are formed on inner wall 604. A representative wedge-shaped protrusion 606 is indicated in FIG. 6.

Cylindrical post 512 of thumbstick base 248 is sized and shaped such that cylindrical cavity 602 of thumbstick top 250 will fit closely thereon. The four tapered channels that surround post 512 are situated such that they may be aligned with the four wedge-shaped protrusions that extend from inner wall 604 of thumbstick top 250, respectively, and are sized and shaped to receive such wedge-shaped protrusions.

To achieve a connection between thumbstick top 250 and thumbstick base 248, a user can position thumbstick top 250 over post 512 of thumbstick base 248 in a manner similar to that shown in FIG. 5. The four wedge-shaped protrusions that are formed on inner wall 604 of thumbstick top 250 must be brought into alignment with the four tapered channels that surround post 512 of thumbstick base 248, respectively. A downward force can then be applied to thumbstick top 250, which will cause each wedge-shaped protrusion to be inserted into a corresponding tapered channel. Due to the geometry of the wedge-shaped protrusions and the tapered channels, the insertion of each wedge-shaped protrusion into a corresponding tapered channel will result in the generation of a wedging or squeezing force that is generally perpendicular to the inclined surfaces of the wedge-shaped protrusion and that will help hold thumbstick top 250 onto post 512 of thumbstick base 248. The insertion of each wedge-shaped protrusion into a corresponding tapered channel will also prevent thumbstick top 250 from tilting or rotating when thumbstick top 250 is engaged with thumbstick base 248 and is being manipulated by a user.

To form the aforementioned connection, a user may applying a downward force to thumbstick top 250 by manually applying pressure thereto (e.g., by pushing a finger downward onto first surface 504 of head 502). However, as will be discussed below, in example game controller 200, thumbstick top 250 comprises a ferromagnetic material that is attracted to magnets and thumbstick base 248 includes a magnet. In accordance with this implementation, when thumbstick top 250 is generally positioned in the manner shown in FIG. 5 and is brought sufficiently close to thumbstick base 248, the magnet in thumbstick base 248 will generate an attractive force that will help thumbstick top 250 automatically align itself with and snap itself onto post 512 of thumbstick base 248. Thus, the use of such a magnet in thumbstick base 248 in combination with the use of a ferromagnetic material that is attracted to the magnet in thumbstick top 250 helps make the connection process easier for the user. Furthermore, this magnet-based connection technique increases the strength of the connection between thumbstick base 248 and thumbstick top 250. Additionally, this magnet-based connection technique may produce a distinct snapping or clicking sound that provides confirmation to the user that a secure connection has been made.

Figure 7:
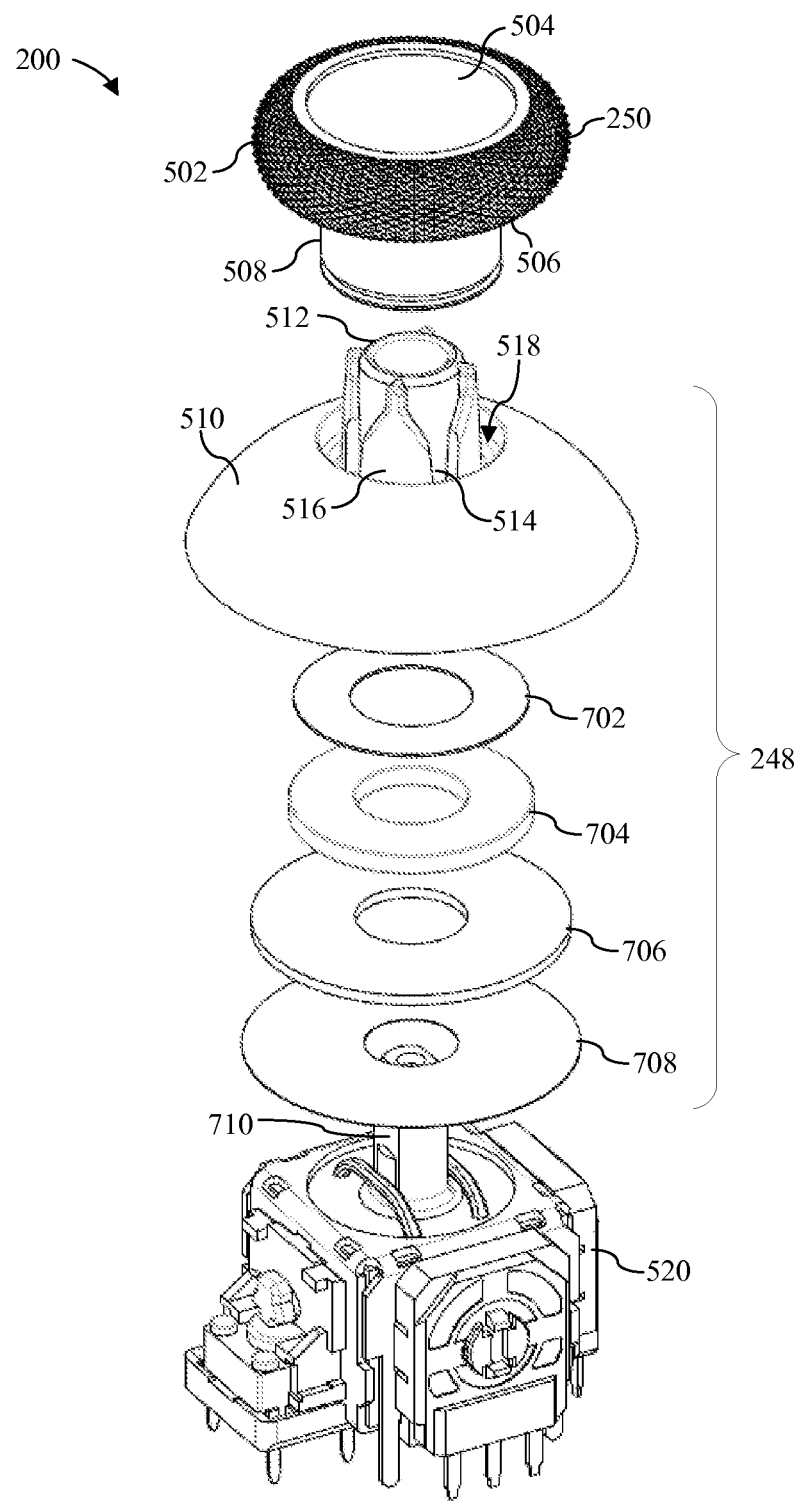
FIG. 7 shows an exploded view of the left thumbstick module and the left thumbstick cap of the game controller of FIG. 2.
Figure 8:
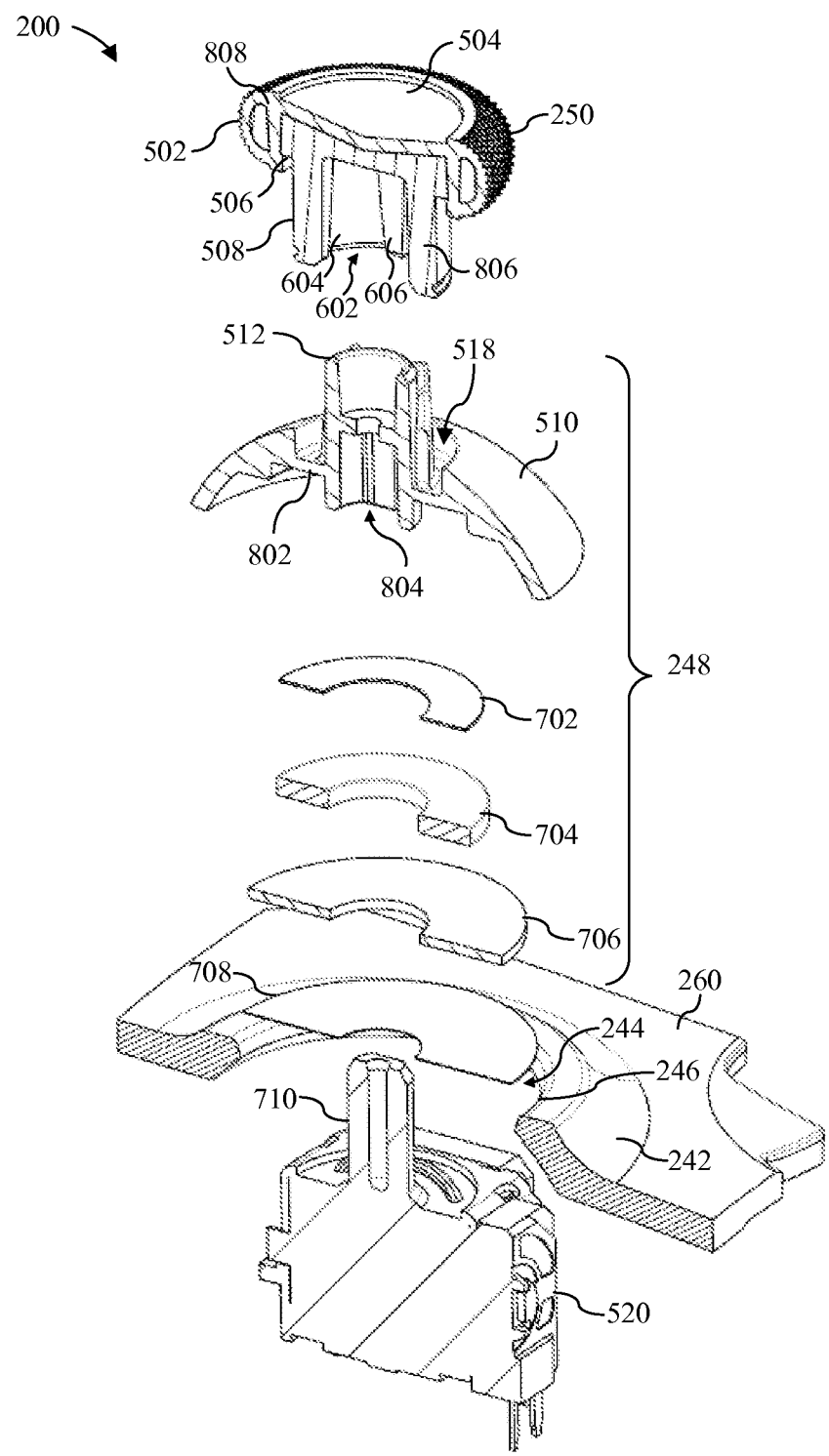
FIG. 8 shows an exploded cross-sectional view of the left thumbstick module, the left thumbstick cap, and a portion of the top case of the game controller of FIG. 2.

These and other features of game controller 200 will now be further described in reference to FIG. 7 and FIG. 8. In particular, FIG. 7 shows an exploded view of left thumbstick module 520 and left thumbstick cap 206 (which comprises thumbstick base 248 and thumbstick top 250) of game controller 200. FIG. 8 shows an exploded cross-sectional view of left thumbstick module 520, left thumbstick cap 206, and a portion of top case 260 of game controller 200.

Left thumbstick module 520 is an electronic component that is mounted on a printed circuit board (not shown) that is disposed within housing 202 of game controller 200. Left thumbstick module 520 includes a moveable post 710 and a plurality of sensors in the form of potentiometers. The potentiometers utilize continuous electrical activity to generate an analog input control signal based on a position of moveable post 710 in relation to a default "center" position. Post 710 is biased such that when there is no force being applied, post 710 will revert to the default "center" position.

Thumbstick base 248 is configured to be mounted upon moveable post 710 of left thumbstick module 520. Thumbstick base 248 comprises dome-shaped component 510, an adhesive component 702, a ring magnet 704, a metal shield 706, and polyimide tape 708.

Dome-shaped component 510 was previously described in reference to FIG. 5. In an embodiment, dome-shaped component 510 is formed from a material that exhibits relatively weak attraction to magnets. For example, in one embodiment, dome-shaped component 510 is formed from 316 stainless steel. Such a material may be used to minimize interference with any magnetic interaction between ring magnet 704 and the ferromagnetic material in thumbstick top 250. Still other materials may be used to form dome-shaped component 510, including other metals or non-metals.

As shown in FIG. 8, a bottom surface of dome-shaped component 510 defines a ring-shaped recess 802 that is sized to closely accommodate ring magnet 704. Prior to insertion of ring magnet into recess 802, adhesive component 702 is inserted there between. Adhesive component 702 operates to keep ring magnet 704 securely fixed in recess 802. In one embodiment, adhesive component 702 comprises double-coated pressure sensitive tape. As will be appreciated by persons skilled in the relevant art(s), double-coated pressure sensitive tape comprises a substrate that is coated on both sides with a pressure sensitive adhesive. However, this is only an example, and other adhesive components may be used to secure ring magnet 704 into recess 802.

In an embodiment, ring magnet 704 comprises a neodymium rare earth magnet, although this is only an example and other suitable types of magnets may be used. In a further embodiment, ring magnet 704 is magnetized axially. In a still further embodiment, ring magnet 704 comprises a quad pole ring magnet. A quad pole ring magnet will have a magnetic field that is smaller than a dipole ring magnet (assuming all other characteristics of the magnet are substantially similar) and may be used to reduce or avoid interference between the magnetic field generated by ring magnet 704 and one or more sensors disposed within game controller 200.

As can be seen in FIG. 8, cylindrical post 512 extends both above the top surface of dome-shaped component 510 and below the bottom surface thereof. Ring magnet 704 is fitted around post 512 beneath the bottom surface of dome-shaped component 510. Below ring magnet 704, a steel shield 706 is also fitted around post 512 and is held in place by a magnetic attraction to ring magnet 704. Steel shield 706 operates to help block the magnetic field generated by ring magnet 704 so as to reduce or avoid interference between the magnetic field generated by ring magnet 704 and one or more sensors disposed within game controller 200. A layer of polyimide tape 706 (e.g., KAPTON® tape) is fastened to a bottom surface of steel shield 706 and operates to protect electronic components internal to game controller 200 from electrostatic discharge (ESD).

Post 512 of dome-shaped component 510 defines a cavity 804 into which moveable post 710 of thumbstick module 520 is inserted. Cavity 804 may be sized and shaped such that an interference fit is achieved between dome-shaped component 510 and moveable post 710. Alternatively or additionally, glue or some other adhesive may be used to secure dome-shaped component 510 to moveable post 710. Moveable post 710 is inserted into cavity 804 through circular gaps in each of polyimide tape 708, metal shield 706, ring magnet 704 and adhesive component 702.

As can also be seen in the cross-sectional view of FIG. 8, thumbstick top 250 includes a component 806 that is made of a ferromagnetic material and comprises stem 508 and a portion of head 502. In an embodiment, component 806 is formed from 17-4 PH stainless steel, which exhibits relatively strong attraction to magnets. However, this is only an example, and other types of materials may be used to implement component 806. Of course, to facilitate a magnetic connection to thumbstick base 248, the material selected for component 806 will preferably be a metal that exhibits at least some attraction to magnets.

As further shown in FIG. 8, thumbstick top 250 also comprises a cover 808 that is connected to component 806 and forms the external surface of head 502. In an embodiment, cover 808 comprises a thermoplastic elastomer (TPE) that is overmolded onto component 806. However, a variety of other materials may be used to form cover 808, including plastic or rubber. Furthermore, in alternate embodiments, the entirety of thumbstick top 250 may be formed from the same material, such as a ferromagnetic material that exhibits a suitable level of magnetic attraction to ring magnet 704.

Figure 9:
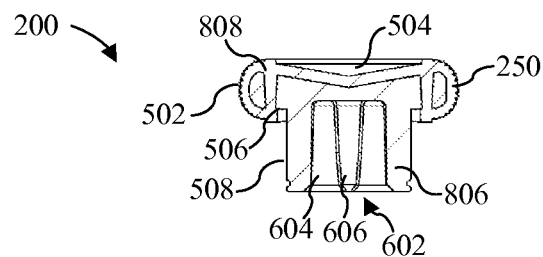
FIG. 9 shows a cross-sectional view of the left thumbstick module, the left thumbstick cap, and a portion of the top case of the game controller of FIG. 2, wherein the top of the left thumbstick cap is disconnected from the base thereof.
Figure 9:
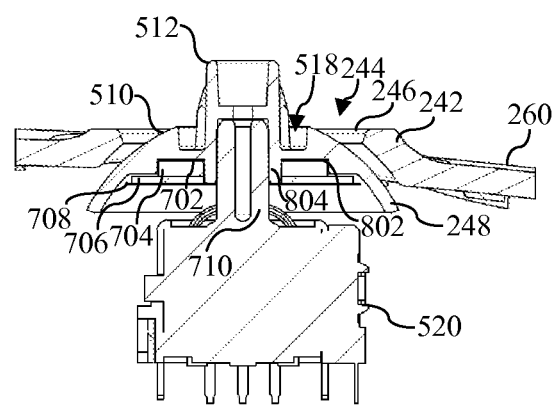
Figure 10:
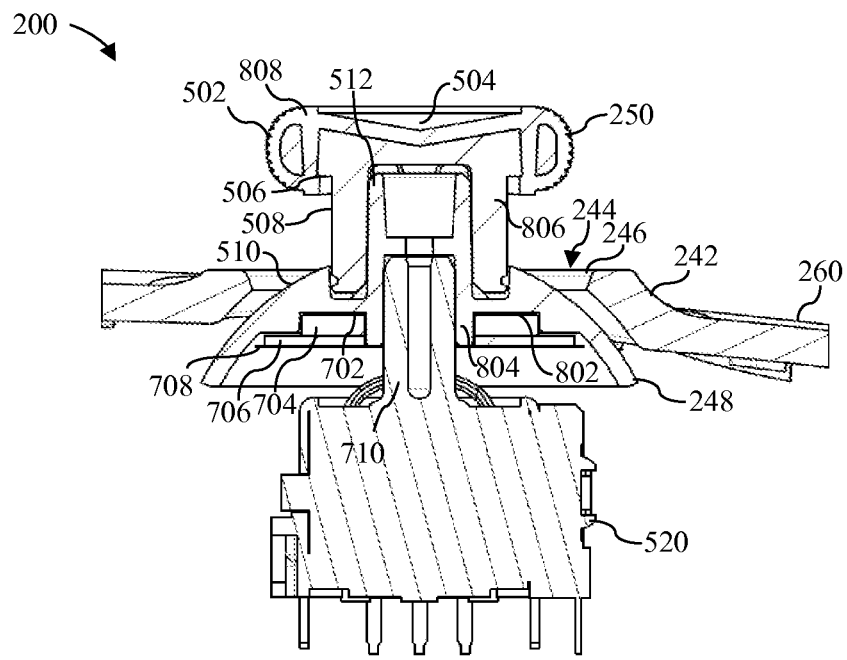
FIG. 10 shows a cross-sectional view of the left thumbstick module, the left thumbstick cap, and a portion of the top case of the game controller of FIG. 2, wherein the top of the left thumbstick cap is connected to the base thereof.

FIG. 9 shows a cross-sectional view of left thumbstick module 520, left thumbstick cap 206 (which comprises thumbstick base 248 and thumbstick top 250), and a portion of top case 260 of game controller 200. In FIG. 9, thumbstick top 250 is disconnected from thumbstick base 248. FIG. 10 shows a cross-sectional view of the same components shown in FIG. 9, except that in FIG. 10 thumbstick top 250 is connected to thumbstick base 248. As can be seen in FIGS. 9 and 10, circular depression 518 of thumbstick base 248 into which stem 508 of thumbstick top 250 is inserted is closely positioned to and vertically aligned with recess 802 and ring magnet 704. This design helps to bring stem 508 into close proximity to ring magnet 704 and increase the magnetic attraction therebetween.

When thumbstick top 250 is connected to thumbstick base 248 in the manner shown in FIG. 10, the interaction between the wedge-shaped protrusions formed on inner wall 604 of thumbstick top 250 and the tapered channels formed on post 512 of thumbstick base 248 as well as the magnetic attraction between component 806 of thumbstick top 250 and ring magnet 704 of thumbstick base 248 help to create a relatively strong and secure connection between thumbstick top 250 and thumbstick base 248. In such a connected state, a user of game controller 200 can manipulate thumbstick top 250 of left thumbstick cap 206, wherein such manipulation will cause a displacement of moveable post 710 of left thumbstick module 520 from the default "center" position and result in the generation of an analog input control signal. During the user's manipulation of thumbstick top 250, the connection formed between thumbstick top 250 and thumbstick base 248 will help thumbstick top 250 remain securely seated on post 512 of thumbstick base 248 and will help prevent thumbstick top 250 from wobbling or rotating.

To remove thumbstick top 250 from thumbstick base 248, a user can pull upward on thumbstick top 250. The degree of force required to remove thumbstick top 250 from thumbstick base 248 may vary depending on the particulars of the design and on how much downward force was applied to thumbstick top 250 when connecting it to thumbstick base 248. In embodiments, such removal of thumbstick top 250 from thumbstick base 248 can be achieved manually (e.g., by pinching or grabbing head 502 of thumbstick top 250 using two or more fingers and pulling upward) without the use of any tools.

As shown in FIG. 10, dome-shaped component 510 of thumbstick base 248 has a diameter that is greater than the diameter of aperture 244. This helps ensure that thumbstick base 248 will remain seated securely in game controller 200 even when a user is pulling upward on thumbstick top 250. As was previously mentioned, dome-shaped component 510 may also have an interference fit with moveable post 710 of thumbstick module 520 and/or be affixed thereto using glue or other adhesive.

It is to be understood that the foregoing description with respect to left thumbstick module 520 and left thumbstick cap 206 is equally applicable to a right thumbstick module (not shown) and right thumbstick cap 204 of game controller 200. Thus, in an embodiment, the interconnection between thumbstick top 240 and thumbstick base 238 of right thumbstick cap 204 is implemented in a substantially similar manner to that described above for thumbstick top 250 and thumbstick base 248 of left thumbstick cap 206.

Only one type of thumbstick top (a thumbstick top having the features of thumbstick top 240 or thumbstick top 250) was described in the foregoing description of game controller 200. However, in an embodiment, one or more differently-shaped thumbstick tops are provided, each of which can engage with thumbstick base 238 or thumbstick base 248 in a substantially similar manner to that described above. In accordance with such an embodiment, each differently-shaped thumbstick top comprises a stem comprising a ferromagnetic material and having an inner wall with wedge-shaped protuberances that is configured to be mounted on post 512 of thumbstick base 248 (or a like post of thumbstick base 238). Such an embodiment enables a user of game controller 200 to easily customize the thumbstick caps thereof to achieve a desired shape. Thus, for example, a user may select a thumbstick top from among a plurality of thumbstick tops having stems of varying lengths in order to achieve a desired thumbstick height. As another example, a user may select a thumbstick top from among a plurality of thumbstick tops having differently-shaped surfaces for finger interaction (e.g., concave, convex or flat). A wide variety of differently-shaped thumbstick tops may be provided to facilitate a high level of user customization. Such customization can be achieved by the user at any time after the user has purchased game controller 200. Since the thumbstick tops can be connected to and disconnected from thumbstick base 238 or thumbstick base 248 without the use of tools, the user can carry out such customization quickly and easily.

In accordance with the foregoing embodiment, the user can improve his or her gaming experience by modifying one or both thumbstick caps of game controller 200 to obtain a preferred shape thereof. The user's preference in this regard may be a general preference or a preference that is based on a particular video game that the user intends to play. In further accordance with the foregoing embodiment, different users of the game controller 200 may modify one or both thumbstick caps thereof to suit their own personal shape preferences prior to use.

In a further embodiment, a plurality of thumbstick tops having different aesthetic appearances are provided, each of which can engage with thumbstick base 238 or thumbstick base 248 in a substantially similar manner to that described above. Such an embodiment enables a user to easily customize the thumbstick cap to achieve a desired aesthetic appearance. Thus, for example, a user may select a thumbstick top of a particular color from among a plurality of different-colored thumbstick tops. As another example, a user may select a thumbstick top that has a desired logo, image, text, or other design formed thereon. A logo, image, text or other design may be formed on a thumbstick top via molding, printing, etching, engraving, stamping, or other suitable technique. A wide variety of thumbstick tops having different appearances may be provided to facilitate a high level of user customization.

Still further customization beyond shape and aesthetic appearance may be achieved by utilizing the user-replaceable thumbstick tops described herein. For example, a user may select from among thumbstick tops that are made of different materials (e.g., different plastics and/or metals) and from among thumbstick tops that have different surfaces (e.g., smooth or rough).

An additional advantage associated with the use of the aforementioned user-replaceable thumbstick tops is that a user can replace a worn or broken thumbstick top with a new one without having to replace game controller 200 and without having to take game controller 200 apart and put it back together again.

The foregoing description of game controller 200 provides only one example of a manner in which a thumbstick cap may be removably connected to a thumbstick base. Such example is not intended to be limiting. In fact, a variety of alternate mechanisms may be used to implement such a connection. To illustrate this, a number of different connection mechanisms will now be described with respect to FIGS. 11-34. Each of these connection mechanisms may be used to implement a different embodiment of a game controller having replaceable thumbstick tops. Each such embodiment can provide similar benefits to those described above with respect to game controller 200.

For example, FIGS. 11-15 show a thumbstick 1100 in which a pair of magnets is used to removably connect a thumbstick top 1102 to a thumbstick base 1104.

Figure 11:
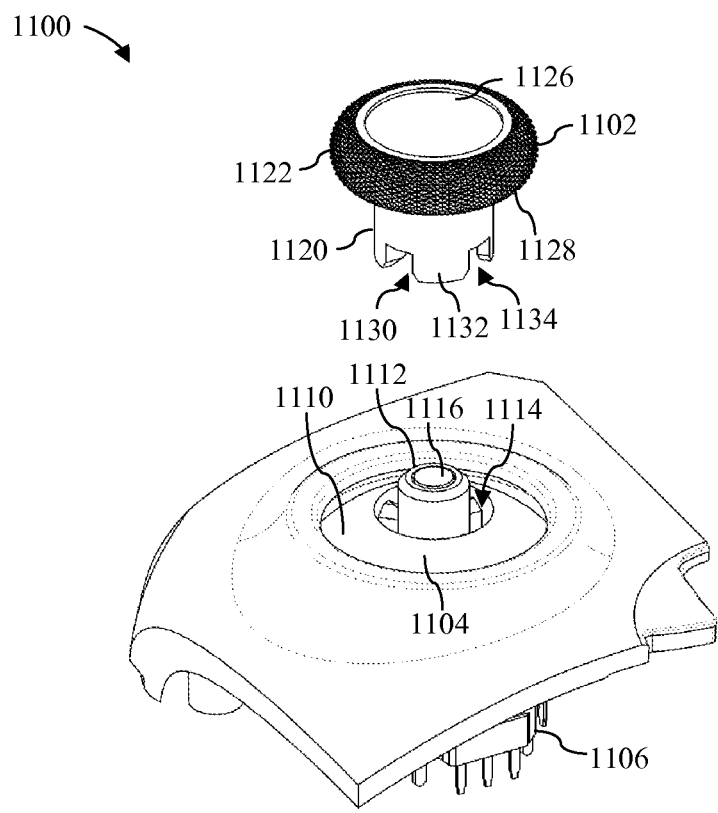
FIG. 11 shows a perspective view of a thumbstick in accordance with an embodiment that comprises a thumbstick base and a thumbstick top that can be removably connected thereto, wherein such connection is facilitated by a first magnet in the thumbstick base and a second magnet in the thumbstick top.

FIG. 11 shows a perspective view of thumbstick 1100 in which thumbstick top 1102 is disconnected from thumbstick base 1104. As shown in FIG. 11, thumbstick base 1104, which is mounted upon a thumbstick module 1106, comprises a dome-shaped component 1110 that includes a cylindrical post 1112 that extends perpendicularly from a top surface thereof. A circular depression 1114 is formed in the top surface of dome-shaped component 1110 and surrounds cylindrical post 1112. A first magnet 1116 is disposed in a recess formed at a top of post 1112. First magnet 1116 may be fixed in the recess using a pressure sensitive adhesive (e.g., double-coated pressure sensitive tape), glue, or some other adhesive. In an alternate embodiment, first magnet 1116 may be fully embedded within post 1112 to ensure that it cannot be removed from or fall out of dome-shaped component 1110.

As further shown in FIG. 11, thumbstick top 1102 comprises a head 1122 and a cylindrical stem 1120 that is connected thereto. Head 1122 includes a first surface 1126 and an opposing second surface 1128. First surface 1126 is adapted to be manipulated by a user's finger (e.g., a user's thumb) and in this example is concave in shape. Stem 1120 extends perpendicularly from second surface 1128. Stem 1120 defines a generally cylindrical cavity 1130 that is open on one end—namely, the end that is opposite to second surface 1128 of head 1122. Four semicircular projections extend from the open end of stem 1120 and define four channels in stem 1120. A representative semicircular projection 1132 and a representative channel 1134 are indicated in FIG. 11.

Figure 12:
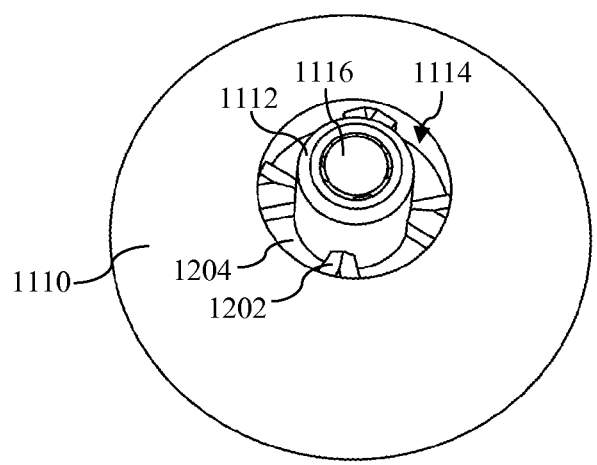
FIG. 12 shows a perspective view of a dome-shaped component of the thumbstick base shown in FIG. 11.

FIG. 12 shows a perspective view of dome-shaped component 1110 that illustrates additional features thereof. As shown in FIG. 12, four wedge-shaped protrusions extend from an outer wall of circular depression 1114 to cylindrical post 1112, thereby defining four semicircular channels around post 1112. A representative wedge-shaped protrusion 1202 and a representative semicircular channel 1204 have been indicated in FIG. 12.

Cylindrical post 1112 of thumbstick base 1104 is sized and shaped such that cylindrical cavity 1130 of thumbstick top 1102 will fit closely thereon. The four semicircular channels that surround post 1112 are situated such that they can be aligned with the four semicircular projections that extend from the open end of stem 1120, respectively, and are sized and shaped to receive such semicircular projections. Likewise, the four channels that are defined by stem 1120 are situated such that they can be aligned with the four wedge-shaped protrusions that surround post 1112, respectively, and are sized and shaped to receive such wedge-shaped protrusions.

To achieve a connection between thumbstick top 1102 and thumbstick base 1104, a user can place thumbstick top 1102 over post 1112 of thumbstick base 1104 in a manner similar to that shown in FIG. 11. The four semicircular projections that extend from the open end of stem 1120 of thumbstick top 1102 must be brought into alignment with the four semicircular channels that surround post 1112 of thumbstick base 1104, respectively. A downward force can then be applied to thumbstick top 1102, which will cause each semicircular projection to be inserted into a corresponding semicircular channel. This will also cause each of the wedge-shaped protrusions of thumbstick base 1104 to be lodged in a corresponding channel of thumbstick top 1102. This configuration will prevent thumbstick top 1102 from tilting or rotating when thumbstick top 1102 is engaged with thumbstick base 1104 and is being manipulated by a user. In an alternate embodiment, the channels formed in thumbstick top 1102 may be tapered so as to create greater interference with the wedge-shaped protrusions of thumbstick base 1104.

To form the aforementioned connection, a user may apply a downward force to thumbstick top 1102 by manually applying pressure thereto (e.g., by pushing a finger downward onto first surface 1126 of head 1122). However, as will be discussed below, thumbstick top 1102 comprises a second magnet 1304 (shown in FIG. 13) that is attracted to first magnet 1116 in thumbstick base 1104. Thus, when thumbstick top 1102 is generally positioned in the manner shown in FIG. 11 and is brought sufficiently close to thumbstick base 1104, the attraction between first magnet 1116 in thumbstick base and second magnet 1304 in thumbstick top 1102 will help thumbstick top 1102 automatically align itself with and snap itself onto post 1112 of thumbstick base 1104. Thus, the use of first magnet 1116 in thumbstick base 1104 in combination with the use of second magnet 1304 in thumbstick top 1102 helps make the connection process easier for the user. Furthermore, this dual magnet connection technique increases the strength of the connection between thumbstick top 1102 and thumbstick base 1104. Additionally, this magnet-based connection technique may produce a distinct snapping or clicking sound that provides confirmation to the user that a secure connection has been made.

Figure 13:
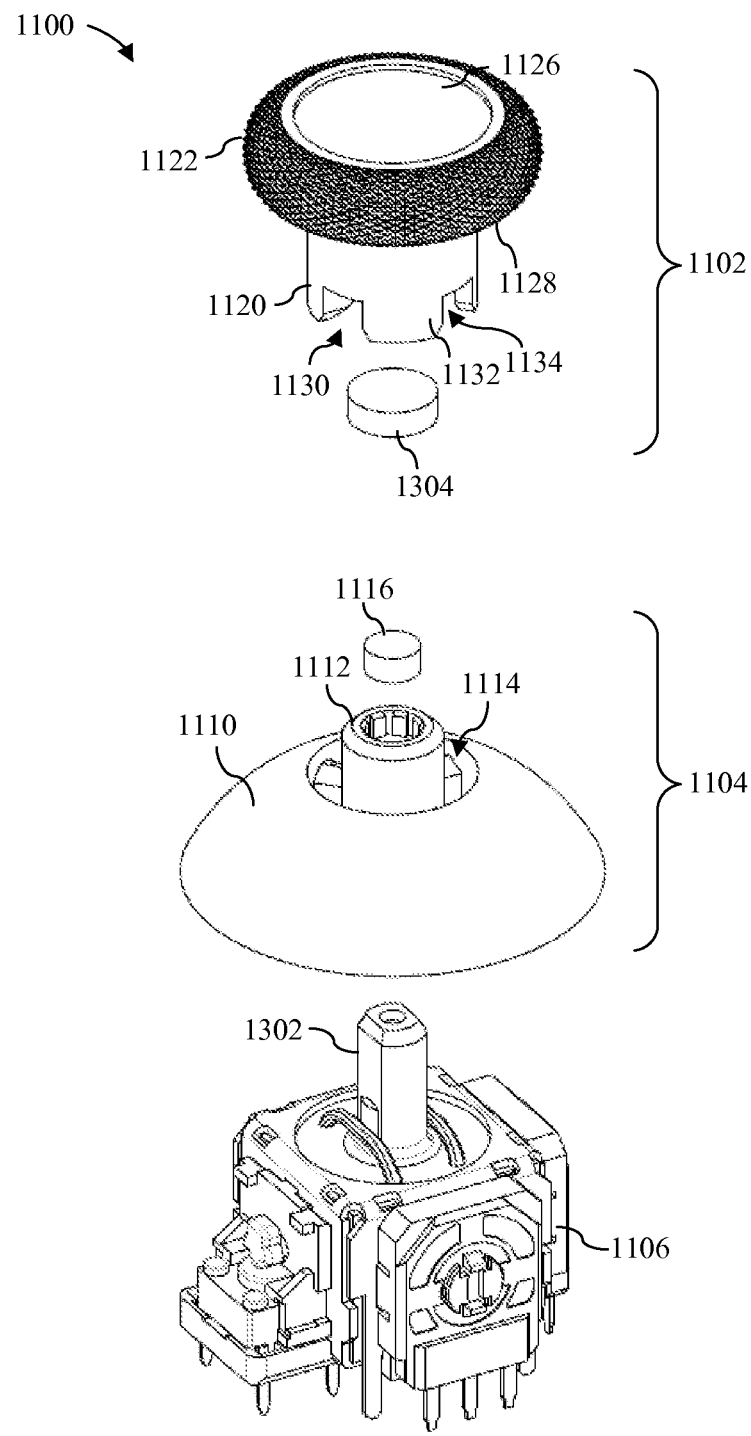
FIG. 13 shows an exploded view of the thumbstick of FIG. 11.

FIG. 13 shows an exploded view of thumbstick 1100. FIG. 13 shows that thumbstick module 1106 includes a moveable post 1302 upon which dome-shaped component 1110 is mounted. Thumbstick module 1106 and moveable post 1302 operate in a substantially similar manner to thumbstick module 520 and moveable post 710 as described above in reference to game controller 200. FIG. 13 also shows second magnet 1304 that is disposed within thumbstick top 1102.

Figure 14:
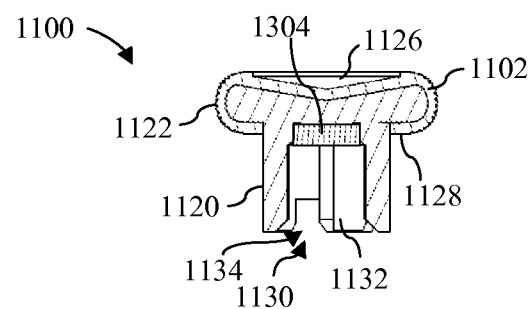
FIG. 14 shows a cross-sectional view of the thumbstick of FIG. 11 in which the thumbstick top is disconnected from thumbstick base.
Figure 14:
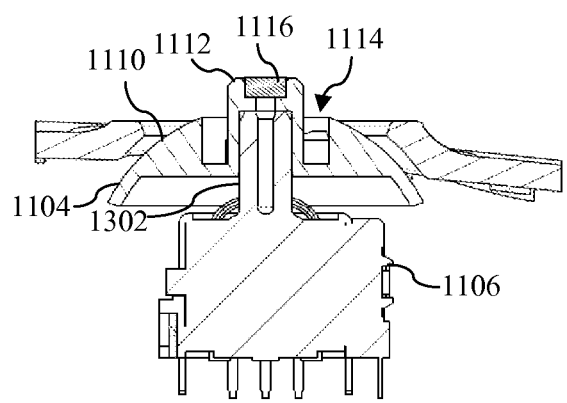
Figure 15:
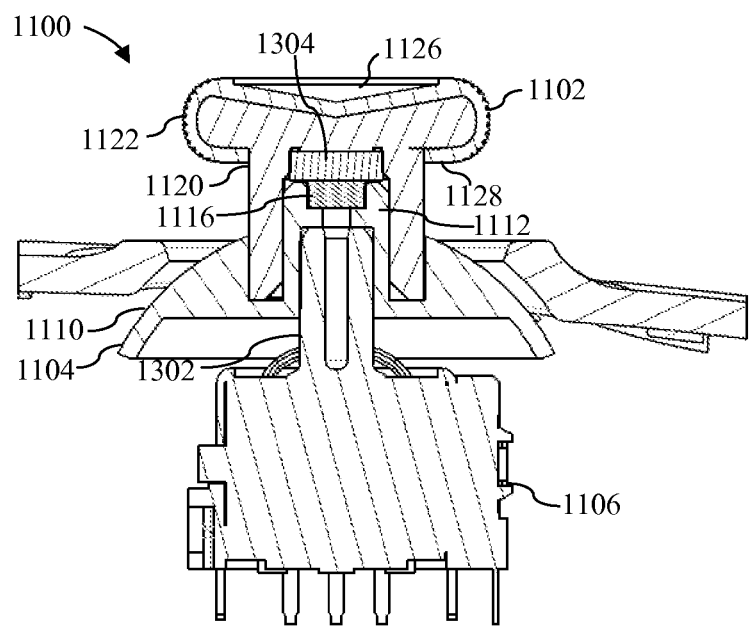
FIG. 15 shows a cross-sectional view of thumbstick of FIG. 11 in which the thumbstick top is connected to the thumbstick base.

FIG. 14 shows a cross-sectional view of thumbstick 1100 in which thumbstick top 1102 is disconnected from thumbstick base 1104. FIG. 15 shows a cross-sectional view of thumbstick 1100 in which thumbstick top 1102 is connected to thumbstick base 1104. As can be seen in FIGS. 14 and 15, second magnet 1304 is disposed in a recess at a closed end of cylindrical cavity 1130. Second magnet 1304 may be fixed in the recess using a pressure sensitive adhesive (e.g., double-coated pressure sensitive tape), glue, or some other adhesive. In an alternate embodiment, second magnet 1304 may be fully embedded within thumbstick top 1102 to ensure that it cannot be removed from or fall out of thumbstick top 1102.

As can also be seen in FIGS. 14 and 15, due to the position of first magnet 1116 and second magnet 1304, as thumbstick top 1102 is guided onto post 1112 of thumbstick base 1104, first magnet 1116 will be brought close to second magnet 1304 and the increased attraction between the two magnets will cause thumbstick top 1102 to be pulled into the connected state with thumbstick base 1104 shown in FIG. 15.

When thumbstick top 1102 is connected to thumbstick base 1104 in the manner shown in FIG. 15, the interaction between the channels formed in cylindrical stem 1120 of thumbstick top 1102 and the wedge-shaped protrusions formed in circular depression 1114 of dome-shaped component 1110 as well as the magnetic attraction between second magnet 1304 of thumbstick top 1102 and first magnet 1116 of thumbstick base 1104 help to create a relatively strong and secure connection between thumbstick top 1102 and thumbstick base 1104. In such a connected state, a user of a can manipulate thumbstick top 1102 of thumbstick 1100, wherein such manipulation will cause a displacement of moveable post 1302 of thumbstick module 1106 from the default "center" position and result in the generation of an analog input control signal. During the user's manipulation of thumbstick top 1102, the connection between thumbstick top 1102 and thumbstick base 1104 will help thumbstick top 1102 remain securely seated on post 1112 of thumbstick base 1104 and will help prevent thumbstick top 1102 from wobbling or rotating.

To remove thumbstick top 1102 from thumbstick base 1104, a user can pull upward on thumbstick top 1102. The degree of force required to remove thumbstick top 1102 from thumbstick base 1104 may vary depending on the particulars of the design and on how much downward force was applied to thumbstick top 1102 when connecting it to thumbstick base 1104. In embodiments, such removal of thumbstick top 1102 from thumbstick base 1104 can be achieved manually (e.g., by pinching or grabbing head 1122 of thumbstick top 1102 using two or more fingers and pulling upward) without the use of any tools.

Another example of a manner in which a thumbstick cap may be removably connected to a thumbstick base will now be described with respect to FIGS. 16-21. In particular, FIGS. 16-21 show a thumbstick 1600 in which a quarter-turn fastener implemented with a spring clip is used to connect a removable thumbstick top 1102 to a thumbstick base 1104.

Figure 16:
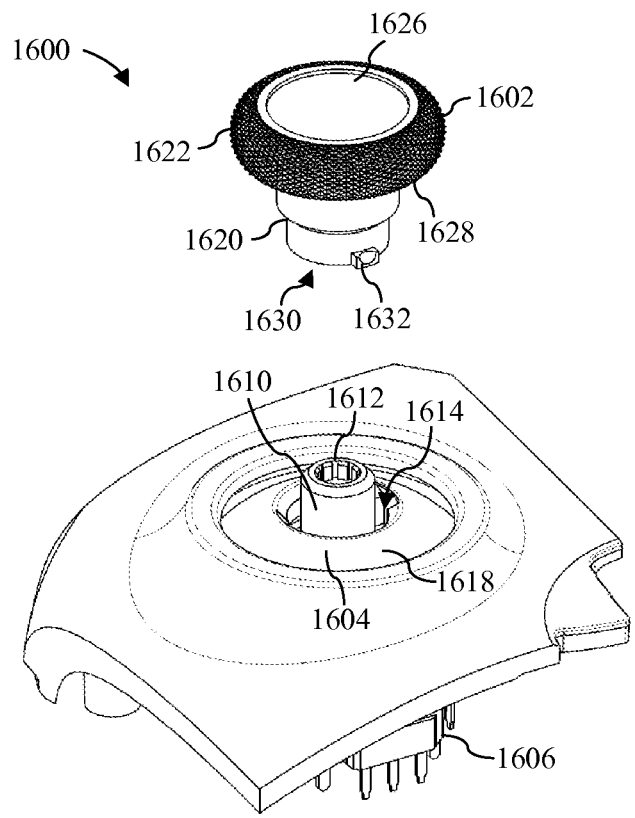
FIG. 16 shows a perspective view of a thumbstick in accordance with an embodiment that comprises a thumbstick base and a thumbstick top that can be removably connected thereto, wherein such connection is facilitated by a quarter-turn fastener implemented with a spring clip.
Figure 17:
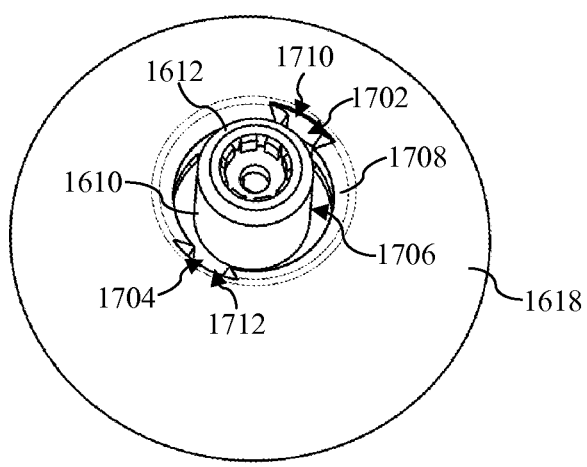
FIG. 17 shows a perspective view of a dome-shaped component and a dome-shaped shell of the thumbstick base shown in FIG. 16.

FIG. 16 shows a perspective view of thumbstick 1600 in which thumbstick top 1602 is disconnected from thumbstick base 1604. As shown in FIG. 16, thumbstick base 1604, which is mounted upon a thumbstick module 1606, comprises a dome-shaped component 1610 and a dome-shaped shell 1618 that covers dome-shaped component 1610. FIG. 17 shows a perspective view of dome-shaped component 1610 and dome-shaped shell 1618.

Dome-shaped component 1610 includes a cylindrical post 1612 that extends perpendicularly from a top surface thereof. A circular depression 1614 is formed in the top surface of dome-shaped component 1610 and surrounds cylindrical post 1612. A first vertical channel 1702 and a second vertical channel 1704 are formed in an outer wall of circular depression 1614. First vertical channel 1702 connects to a first semicircular channel 1902 (shown in FIG. 19) that is formed at a base of circular depression 1614 and second vertical channel 1704 connects to a second semicircular channel 1904 (shown in FIG. 19) that is formed at the base of circular depression 1614.

A central hole 1706 is formed in dome-shaped shell 1618 and is surrounded by an inclined edge 1708 thereof. A first notch 1710 and a second notch 1712 are formed in inclined edge 1708. Dome-shaped shell 1618 is disposed on top of dome-shaped component 1610 in such a manner that first notch 1710 is aligned with first vertical channel 1702 and second notch 1712 is aligned with second vertical channel 1704.

As further shown in FIG. 16, thumbstick top 1602 comprises a head 1622 and a cylindrical stem that is connected thereto. Head 1622 includes a first surface 1626 and an opposing second surface 1628. First surface 1626 is adapted to be manipulated by a user's finger (e.g., a user's thumb) and in this example is concave in shape. Stem 1620 extends perpendicularly from second surface 1628. Stem 1620 defines a generally cylindrical cavity 1630 that is open on one end—namely, the end that is opposite to second surface 1628 of head 1622. A first protuberance 1632 and a second protuberance 1906 (shown in FIG. 19) project outward from opposite sides of stem 1620. Each of first protuberance 1632 and second protuberance 1906 is rigid, generally shaped like a rectangular prism and has a dimple formed therein.

Figure 18:
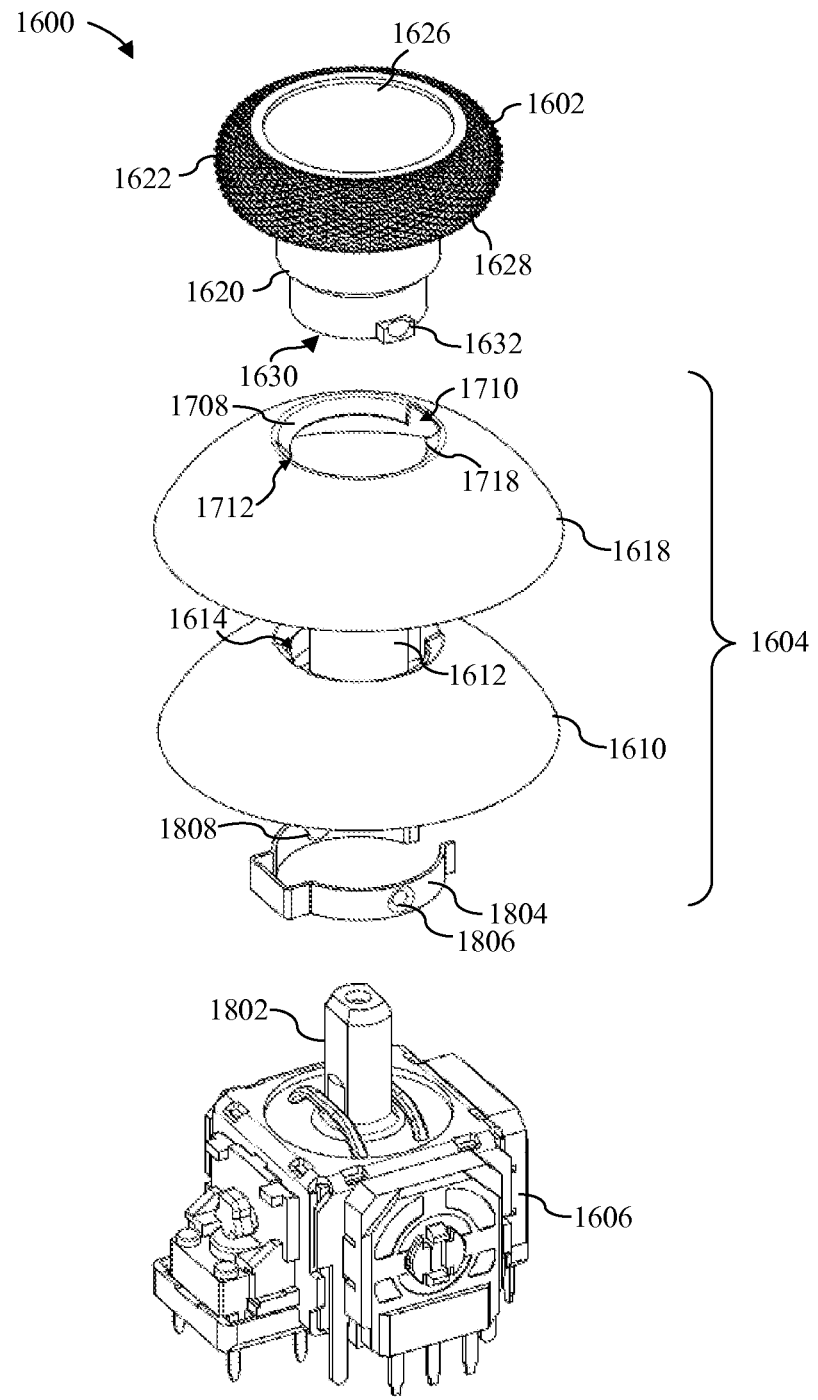
FIG. 18 shows an exploded view of the thumbstick of FIG. 16.
Figure 19:
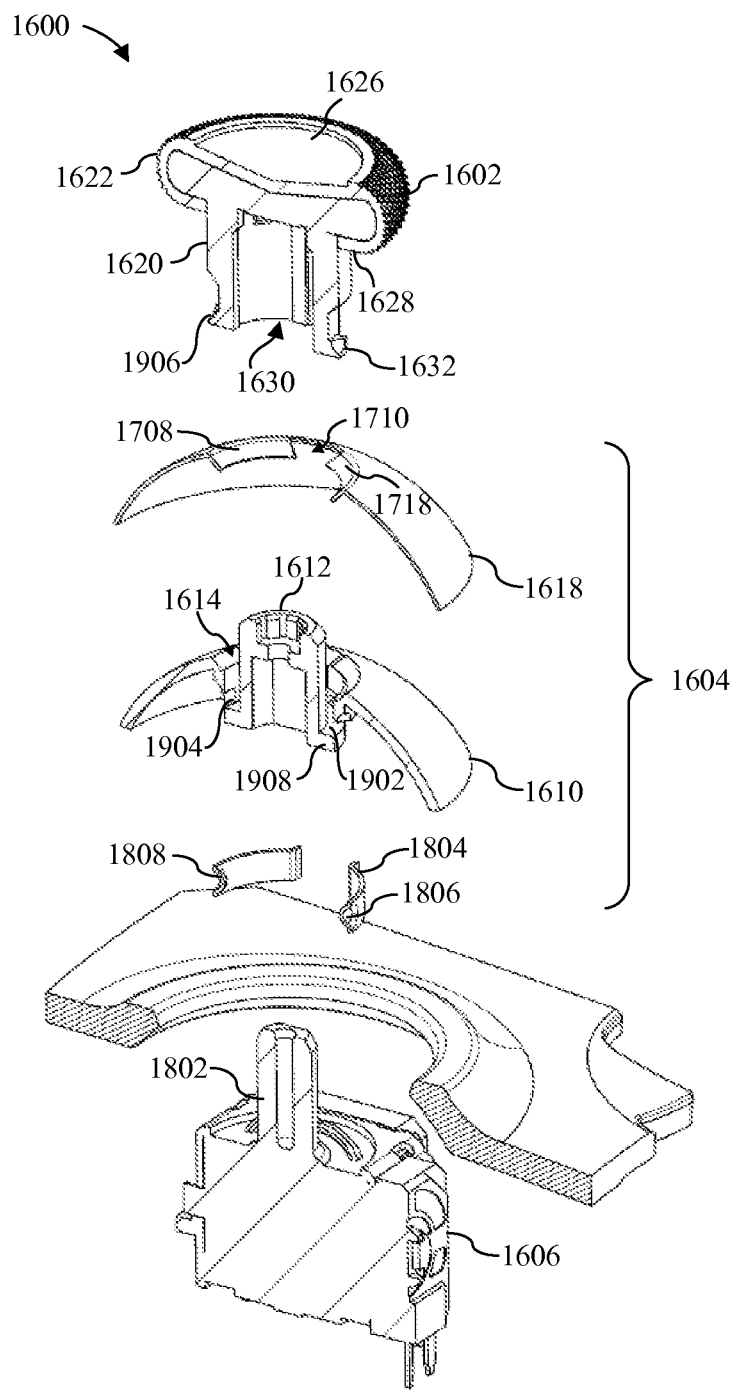
FIG. 19 shows an exploded cross-sectional view of the thumbstick of FIG. 16.
Figure 20:
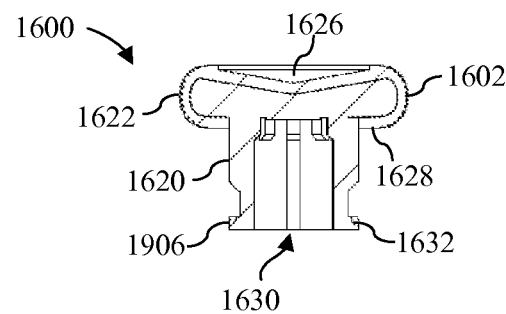
FIG. 20 shows a cross-sectional view of the thumbstick of FIG. 16 in which the thumbstick top is disconnected from the thumbstick base.
Figure 20:
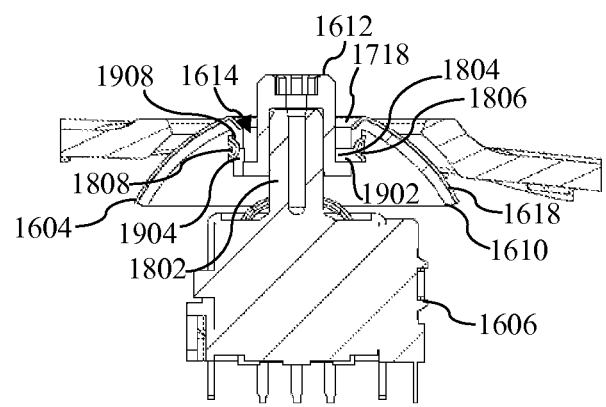
Figure 21:
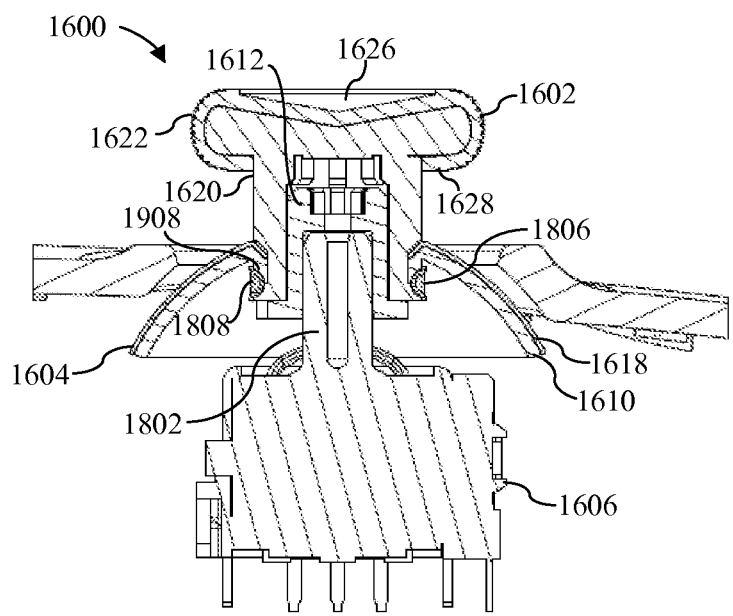
FIG. 21 shows a cross-sectional view of the thumbstick of FIG. 16 in which the thumbstick top is connected to the thumbstick base.

FIG. 18 shows an exploded view of thumbstick 1600. FIG. 19 shows an exploded cross-sectional view of thumbstick 1600. FIG. 20 shows a cross-sectional view of thumbstick 1600 in which thumbstick top 1602 is disconnected from thumbstick base 1604. FIG. 21 shows a cross-sectional view of thumbstick 1600 in which thumbstick top 1602 is connected to thumbstick base 1604.

These figures show that thumbstick module 1606 includes a moveable post 1802 upon which dome-shaped component 1610 is mounted. Thumbstick module 1606 and moveable post 1802 operate in a substantially similar manner to thumbstick module 520 and moveable post 710 as described above in reference to game controller 200.

As further shown in these figures, thumbstick base 1604 also includes a generally C-shaped spring clip 1804. A first convex projection 1806 and a second convex projection 1808 are formed on an inner surface of spring clip 1804. Spring clip 1804 is mounted upon a circular projection 1908 formed on a bottom surface of dome-shaped component 1610. When spring clip 1804 is mounted upon circular projection 1908, first convex projection 1806 is aligned with and projects into first semicircular channel 1902 and second convex projection 1808 is aligned with and projects into second semicircular channel 1904.

Cylindrical post 1612 of thumbstick base 1604 is sized and shaped such that cylindrical cavity 1630 of thumbstick top 1602 will fit closely thereon. To achieve a connection between thumbstick top 1602 and thumbstick base 1604, a user may place thumbstick top 1602 over post 1612 of thumbstick base 1604 in a manner similar to that shown in FIG. 16. The user must then align first protuberance 1632 with one of first notch 1710 and second notch 1712 and must align second protuberance 1906 with the other one of first notch 1710 and second notch 1712. After achieving such an alignment, the user can then press thumbstick top 1602 down onto post 1612 of thumbstick base 1604. If the user does not achieve such an alignment, first and second protuberances 1632 and 1906 will be blocked by inclined edge 1708 of dome-shaped shell 1618 and this will prevent thumbstick top 1602 from being connected to thumbstick base 1604.

If the user achieves the proper alignment and presses down on thumbstick top 1602, one of first protuberance 1632 and second protuberance 1906 will pass through first notch 1710 and first vertical channel 1702 and come to rest in first semicircular channel 1902 while the other one of first protuberance 1632 and second protuberance 1906 will pass through second notch 1712 and second vertical channel 1704 and come to rest in second semicircular channel 1904. First and second semicircular channels 1902 and 1904 are designed to allow each protuberance to be turned 90° (a quarter-turn) horizontally and in a clockwise direction. Thus, if the user applies a clockwise quarter turn to thumbstick top 1602, each of first and second protuberances 1632 and 1906 will pass through a corresponding one of first and second semicircular channels 1902 and 1904. As each protuberance passes to the end of a corresponding semicircular channel, each protuberance will cause a corresponding one of first convex projection 1806 and second convex projection 1808 of spring clip 1804 to first deflect and then snap into the dimple formed on the protuberance. The snapping of first convex projection 1806 and second convex projection 1808 into a corresponding dimple of first protuberance 1632 and second protuberance 1906 will help secure thumbstick top 1602 to thumbstick base 1604. The snapping may also be sensed (e.g., heard or felt) by the user and thereby indicate to the user that a secure connection has been achieved.

Figure 22:
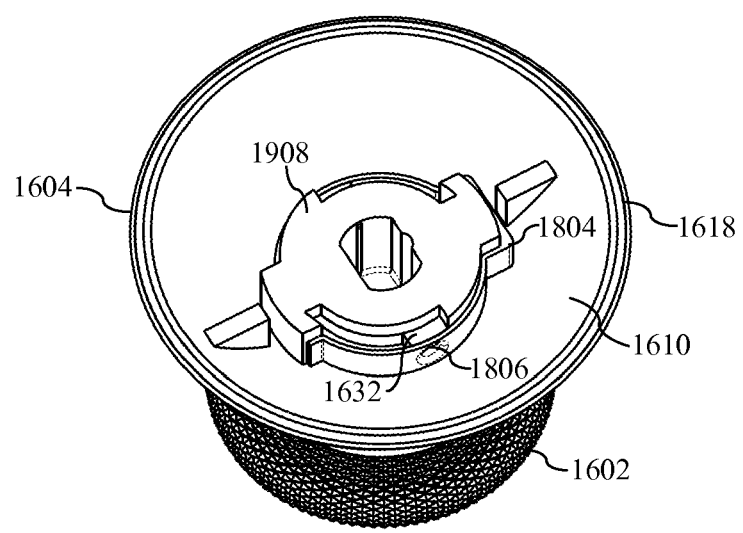
FIG. 22 shows a bottom perspective view of the thumbstick base and the thumbstick top of the thumbstick of FIG. 16, wherein the thumbstick top is connected to the thumbstick base.

FIG. 22 shows a bottom perspective view of thumbstick top 1602 and thumbstick base 1604 when these components are in a connected state. In the connected state, first and second protuberances 1632 and 1906 extend below the bottom surface of dome-shaped component 1610. Such an arrangement will thus prevent thumbstick top 1602 from being drawn up and out of thumbstick base 1604. Furthermore, in the connected state, first and second convex projections 1806 and 1808 of spring clip 1806 will extend into a corresponding one of the dimples of first and second protuberances 1632 and 1906 and act as detents that will help prevent wobbling and horizontal rotation of thumbstick top 1602 within thumbstick base 1604.

To remove thumbstick top 1602 from thumbstick base 1604, a user can apply a force to rotate thumbstick cap 90° (a quarter-turn) horizontally and in a counterclockwise direction and thereby align first and second protuberances 1632 and 1906 with a corresponding one of first and second vertical channels 1702 and 1704 (or first and second notches 1710 and 1712). The force applied by the user must be sufficient to disengage first and second protuberances 1632 and 1906 from first and second convex projections 1806 and 1808. Once the proper alignment has been achieved, the user need only pull upward on thumbstick top 1602 to remove it. In embodiments, such removal of thumbstick top 1602 from thumbstick base 1604 can be achieved manually without the use of any tools.

Figure 23:
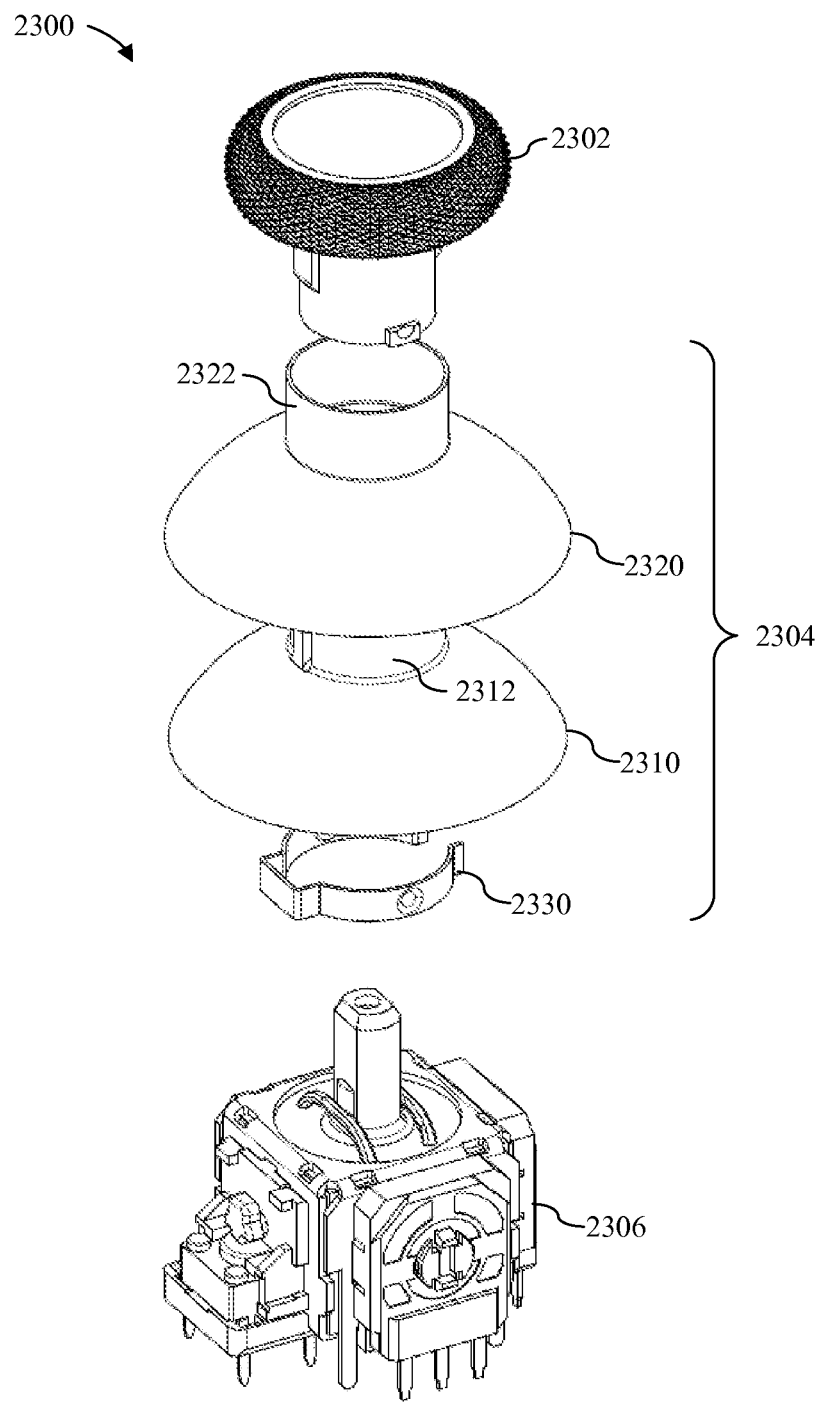
FIG. 23 shows an exploded view of another thumbstick in accordance with an embodiment in which a quarter-turn fastener implemented with a spring clip is used to connect a removable thumbstick top to a thumbstick base.

FIG. 23 shows an exploded view of another thumbstick 2300 in which a quarter-turn fastener implemented with a spring clip is used to connect a removable thumbstick top to a thumbstick base. In particular, and as shown in FIG. 23, the quarter-turn fastener implemented with a spring clip is used to connect a removable thumbstick top 2302 to a thumbstick base 2304 that is mounted upon a thumbstick module 2306.

The design of thumbstick 2300 is substantially similar to that of thumbstick 1600 as described above in reference to FIGS. 16-22. Thus, for example, thumbstick base 2304 comprises a dome-shaped component 2310 having a circular depression formed in a top surface thereof that is adapted to receive a cylindrical stem of thumbstick top 2302. Thumbstick base 2304 also comprise a dome-shaped shell 2320 that is disposed over dome-shaped component 2310. Furthermore, a spring clip 2330 is mounted upon a circular projection that extends from a bottom surface of dome-shaped component 2310. Spring clip 2330 is configured to engage with protuberances that extend from the stem of thumbstick top 2302 when the stem of thumbstick top 2302 is inserted into the circular depression formed in dome-shaped component 2310 and rotated 90° horizontally and in a clockwise direction.

In contrast to thumbstick 1600, however, dome-shaped component 2310 comprises a first collar 2312 and dome-shaped shell 2320 comprises a second collar 2322. First and second collars 2312 and 2320 surround the circular depression formed in dome-shaped component 2310. When thumbstick top 2302 is connected to thumbstick base 2304, first and second collars 2312 and 2320 will surround the stem of thumbstick top 2302. Thus, first and second collars 2312 and 2320 will provide stability to thumbstick top 2302 when it is connected to thumbstick base 2304 and further prevent thumbstick top 2302 from wobbling when a user interacts therewith.

Another example of a manner in which a thumbstick cap may be removably connected to a thumbstick base will now be described with respect to FIGS. 24-29. In particular, FIGS. 24-29 show a thumbstick 2400 in which a quarter-turn fastener implemented with a rotational snap is used to connect a removable thumbstick top 2402 to a thumbstick base 2404. Thumbstick 2400 also utilizes two magnets to facilitate the connection between thumbstick top 2402 and thumbstick base 2404.

Figure 24:
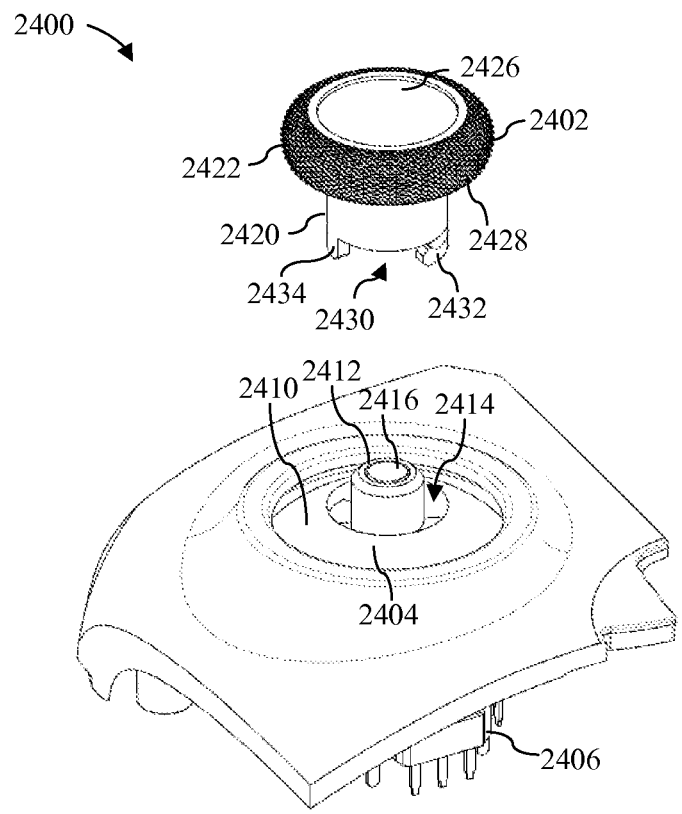
FIG. 24 shows a perspective view of a thumbstick in accordance with an embodiment that comprises a thumbstick base and a thumbstick top that can be removably connected thereto, wherein such connection is facilitated by a quarter-turn fastener implemented with a rotational snap.

FIG. 24 shows a perspective view of thumbstick 2400 in which thumbstick top 2402 is disconnected from thumbstick base 2404. As shown in FIG. 24, thumbstick base 2404, which is mounted upon a thumbstick module 2406, comprises a dome-shaped component 2410 that includes a cylindrical post 2412 that extends perpendicularly from a top surface thereof. A circular depression 2414 is formed in the top surface of dome-shaped component 2410 and surrounds cylindrical post 2412. A first magnet 2416 is disposed in a recess formed at a top of post 2412. First magnet 2416 may be fixed in the recess using a pressure sensitive adhesive (e.g., double-coated pressure sensitive tape), glue, or some other adhesive. In an alternate embodiment, first magnet 2416 may be fully embedded within post 2412 to ensure that it cannot be removed from or fall out of dome-shaped component 2410.

As further shown in FIG. 24, thumbstick top 2402 comprises a head 2422 and a cylindrical stem 2420 that is connected thereto. Head 2422 includes a first surface 2426 and an opposing second surface 2428. First surface 2426 is adapted to be manipulated by a user's finger (e.g., a user's thumb) and in this example is concave in shape. Stem 2420 extends perpendicularly from second surface 2428. Stem 2420 defines a generally cylindrical cavity 2430 that is open on one end—namely, the end that is opposite to second surface 2428 of head 2422. A first semicircular arm 2432 and a second semicircular arm 2434 extend from the open end of stem 2420.

Figure 25:
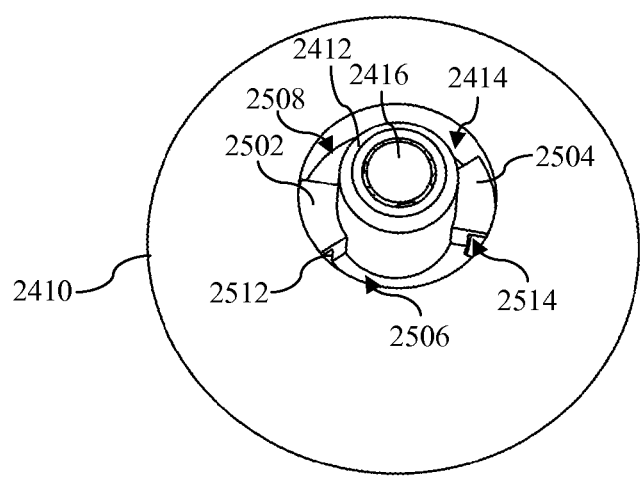
FIG. 25 shows a perspective view of a dome-shaped component of the thumbstick base shown in FIG. 24.

FIG. 25 shows a perspective view of dome-shaped component 2410 that illustrates additional features thereof. As shown in FIG. 25, a first semi-circular protrusion 2502 and a second semicircular protrusion 2504 extend from an outer wall of circular depression 2414 to cylindrical post 2412, thereby defining a first semicircular recess 2506 and a second semicircular recess 2508 around post 1112. A first semicircular channel 2512 is formed in first semicircular projection 2502 and a second semicircular channel 2514 is formed in second semicircular projection 2504.

Cylindrical post 2412 of thumbstick base 2404 is sized and shaped such that cylindrical cavity 2430 of thumbstick top 2402 will fit closely thereon. To achieve a connection between thumbstick top 2402 and thumbstick base 2404, a user may place thumbstick top 2402 over post 2412 of thumbstick base 2404 in a manner similar to that shown in FIG. 24. The user must then align first semicircular arm 2432 with one of first semicircular recess 2506 and second semicircular recess 2508 and must align second semicircular arm 2434 with the other one of first semicircular recess 2506 and second semicircular recess 2508. After achieving such an alignment, the user can then press thumbstick top 2402 down onto post 2412 of thumbstick base 2404. If the user does not achieve such an alignment, first and second semicircular arms 2432 and 2434 will be blocked by first and second semicircular protrusions 2502 and 2504 and this will prevent thumbstick top 2402 from being connected to thumbstick base 2404.

If the user achieves the proper alignment and presses down on thumbstick top 2402, one of first semicircular arm 2432 and second semicircular arm 2434 will come to rest in first semicircular recess 2506 while the other one of first semicircular arm 2432 and second semicircular arm 2434 will come to rest in second semicircular recess 2508. From this position, the user can turn thumbstick top 2402 90° (a quarter-turn) horizontally and in a clockwise direction. This will cause one of first semicircular arm 2432 and second semicircular arm 2434 to pass through first semicircular channel 2512 and will cause the other one of first semicircular arm 2432 and second semicircular arm 2434 to pass through second semicircular channel 2514. Each of first semicircular arm 2432 and second semicircular arm 2434 includes a knob at the end thereof that is wider than the remainder of the arm and slightly wider than first and second semicircular channels 2512 and 2514. Such knobs are deflected when the user forces semicircular arms 2432 and 2434 through a corresponding one of first and second semicircular channels 2512 and 2514 and then snap back when the knobs emerge from the opposite sides of those channels. This rotational snap will help secure thumbstick top 2402 to thumbstick base 2404. This rotational snap may also be sensed (e.g., heard or felt) by the user and thereby indicate to the user that a secure connection has been achieved.

As will be discussed below, the connection between thumbstick top 2402 and thumbstick base 2404 is further facilitated by a second magnet 2604 (shown in FIG. 26) that comprises part of thumbstick top 2402 and is attracted to first magnet 2416 in thumbstick base 2404.

Figure 26:
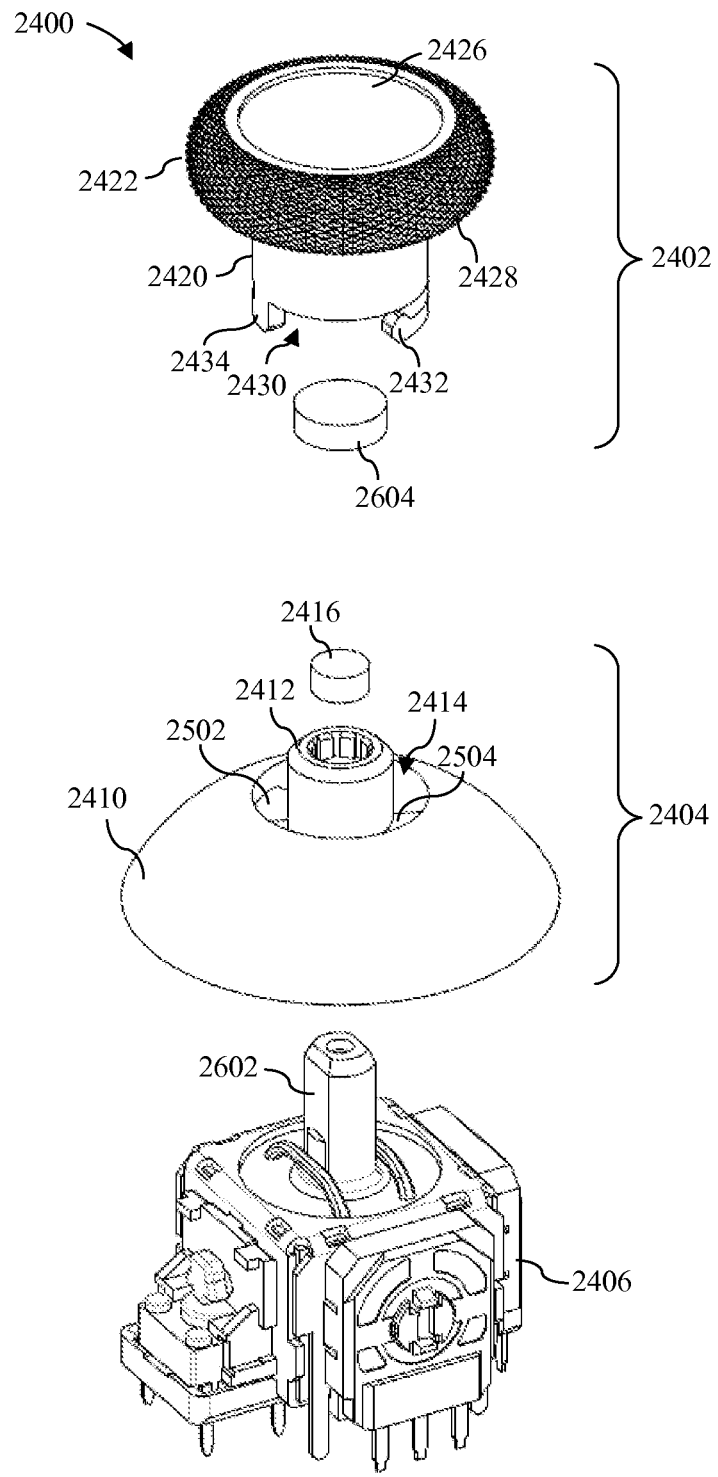
FIG. 26 shows an exploded view of the thumbstick of FIG. 24.
Figure 27:
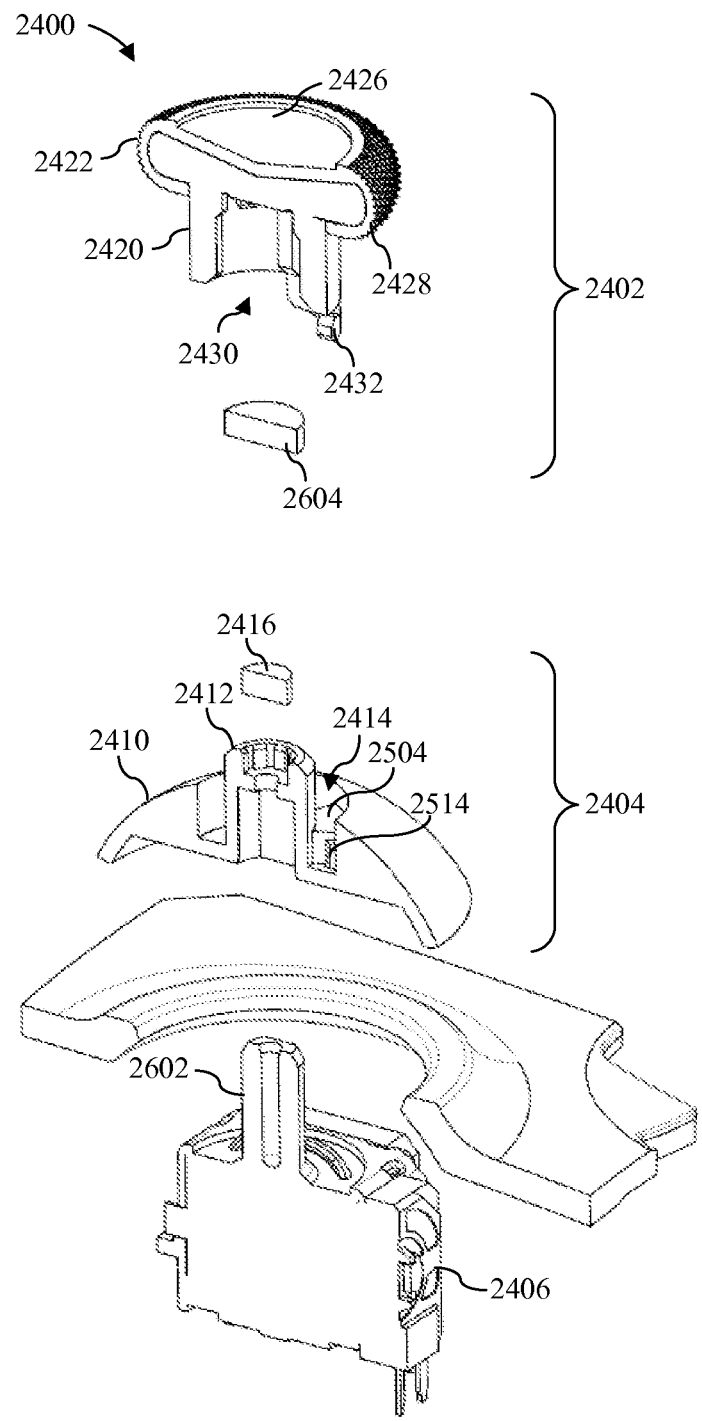
FIG. 27 shows an exploded cross-sectional view of the thumbstick of FIG. 24.

FIG. 26 shows an exploded view of thumbstick 2400. FIG. 27 shows an exploded cross-sectional view of thumbstick 2400. As shown in these figures, thumbstick module 2406 includes a moveable post 2602 upon which dome-shaped component 2410 is mounted. Thumbstick module 2406 and moveable post 2602 operate in a substantially similar manner to thumbstick module 520 and moveable post 710 as described above in reference to game controller 200. FIGS. 26 and 27 also show second magnet 2604 that is disposed within thumbstick top 2402.

Figure 28:
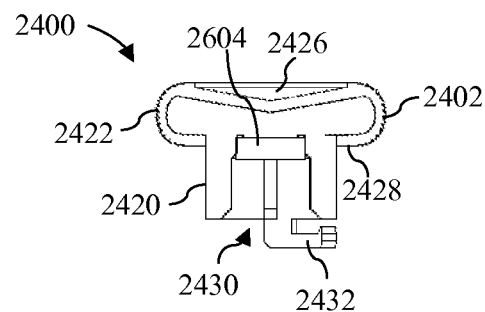
FIG. 28 shows a cross-sectional view of the thumbstick of FIG. 24 in which the thumbstick top is disconnected from the thumbstick base.
Figure 28:
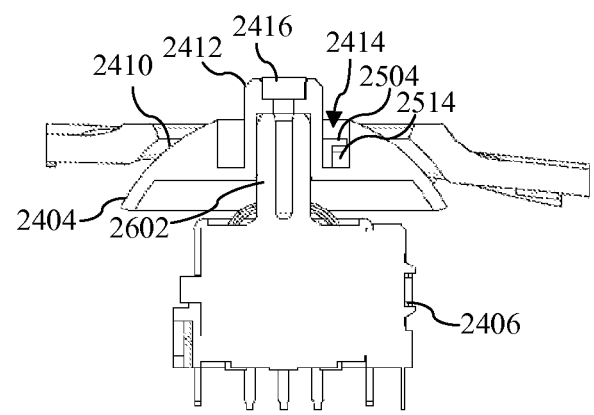
Figure 29:
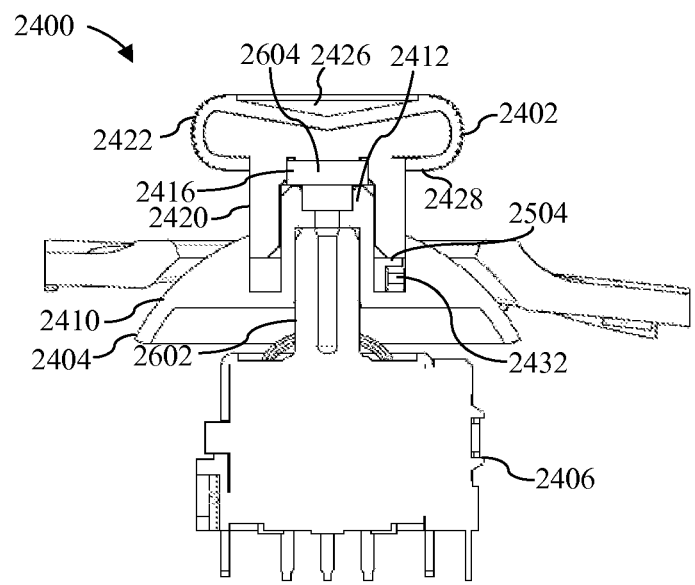
FIG. 29 shows a cross-sectional view of the thumbstick of FIG. 24 in which the thumbstick top is connected to the thumbstick base.

FIG. 28 shows a cross-sectional view of thumbstick 2400 in which thumbstick top 2402 is disconnected from thumbstick base 2404. FIG. 29 shows a cross-sectional view of thumbstick 2400 in which thumbstick top 2402 is connected to thumbstick base 2404. As can be seen in FIGS. 28 and 29, second magnet 2604 is disposed in a recess at a closed end of cylindrical cavity 2430. Second magnet 2604 may be fixed in the recess using a pressure sensitive adhesive (e.g., double-coated pressure sensitive tape), glue, or some other adhesive. In an alternate embodiment, second magnet 2604 may be fully embedded within thumbstick top 2402 to ensure that it cannot be removed from or fall out of thumbstick top 2402.

As can also be seen in FIGS. 28 and 29, due to the position of first magnet 2416 and second magnet 2604, as thumbstick top 2402 is guided onto post 2412 of thumbstick base 2404, first magnet 2416 will be brought close to second magnet 2604 and the increased attraction between the two magnets will cause thumbstick top 2402 to be pulled onto thumbstick base 2404.

In the connected state shown in FIG. 29, first and second semicircular arms 2432 and 2434 are each locked in a corresponding one of first or second semicircular channels 2512 and 2514. Such an arrangement will thus prevent thumbstick top 2402 from being drawn up and out of thumbstick base 2404. Such an arrangement will also help to prevent wobbling and horizontal rotation of thumbstick top 2402 within thumbstick base 2404.

To remove thumbstick top 2402 from thumbstick base 2404, a user can apply a force to rotate thumbstick cap 90° (a quarter-turn) horizontally and in a counterclockwise direction and thereby remove first and second semicircular arms 2432 and 2434 from a corresponding one of first or second semicircular channels 2512 and 2514. The force applied by the user must be sufficient to deflect the knobs at the ends of first and second semicircular arms 2432 and 2434 such that those components can pass through first and second semicircular channels 2512 and 2514. Once this has been achieved, the user need only pull upward on thumbstick top 2402 to remove it. In embodiments, such removal of thumbstick top 2402 from thumbstick base 2404 can be achieved manually without the use of any tools.

Other designs based on the user of quarter turn rotational snaps may be used to removably connect a thumbstick top to a thumbstick base. For example, in an alternate embodiment, a stem of a thumbstick cap comprises two rigid protrusions that can each be inserted into a corresponding semicircular channel formed at the base of a circular depression in a thumbstick base via a corresponding groove in the thumbstick base. Each semicircular channel of the thumbstick base is defined in part by a semicircular arm. After such insertion, the application of a quarter turn to the thumbstick cap will cause each rigid protrusion to move along a corresponding one of the semicircular channels and deflect a corresponding one of the semicircular arms until a hook at the end of each semicircular arm snaps into a notch in each rigid protrusion, thereby locking the thumbstick top into the thumbstick base.

Another example of a manner in which a thumbstick cap may be removably connected to a thumbstick base will now be described with respect to FIGS. 30-34. In particular, FIGS. 30-34 show a thumbstick 3000 in which a quarter-turn fastener implemented with ball detents is used to connect a removable thumbstick top 3002 to a thumbstick base 3004.

Figure 30:
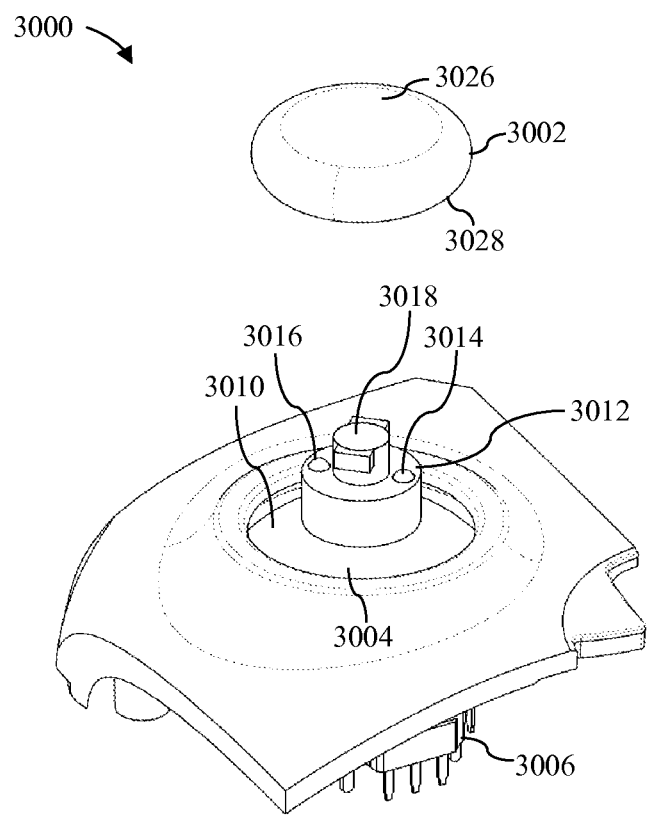
FIG. 30 shows a perspective view of a thumbstick in accordance with an embodiment that comprises a thumbstick base and a thumbstick top that can be removably connected thereto, wherein such connection is facilitated by a quarter-turn fastener implemented with ball detents.

FIG. 30 shows a perspective view of thumbstick 3000 in which thumbstick top 3002 is disconnected from thumbstick base 3004. As shown in FIG. 30, thumbstick base 3004, which is mounted upon a thumbstick module 3006, comprises a dome-shaped component 3010 that includes a cylindrical stem 3012 that extends perpendicularly from a top surface thereof. A cylindrical post 3018 extends from a top surface of cylindrical stem 3412. Two rigid protrusions extend from opposing sides of a topmost portion of cylindrical post 3018. A first ball detent 3014 and a second ball detent 3016 each project out from opposing sides of the top surface of cylindrical stem 3012.

Figure 31:
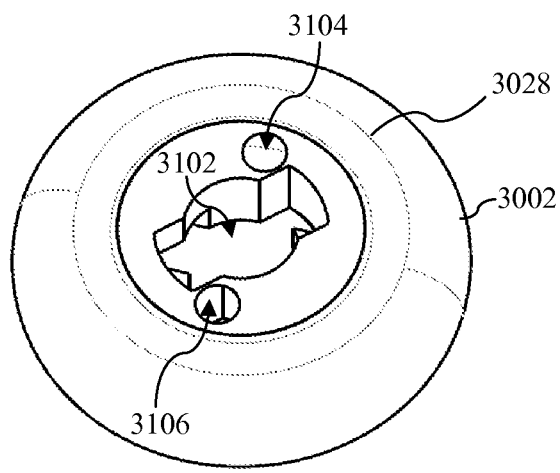
FIG. 31 shows a bottom perspective view of the thumbstick top of FIG. 30.

As further shown in FIG. 30, thumbstick top 3002 comprises a top surface 3026 and an opposing bottom surface 3028. FIG. 31 shows a bottom perspective view of thumbstick top 3002 that reveals additional features thereof. As shown in FIG. 31, a cavity 3102 is formed in a center of bottom surface 3028 of thumbstick top 3002. Furthermore, a first circular concavity 3104 and a second circular concavity 3106 are formed in the bottom surface 3028 on opposite sides of cavity 3102.

To connect thumbstick top 3002 to thumbstick base 3004, thumbstick top 3002 may be positioned over thumbstick base 3004 in a manner similar to that shown in FIG. 30. In this position, cavity 3102 must be brought into alignment with cylindrical post 3018 of thumbstick base 3004 and the rigid protrusions that extend therefrom such that cavity 3102 can be mounted onto those components. If such an alignment is not achieved, then the rigid protrusions will block thumbstick top 3002 from being connected to thumbstick base 3004.

When such an alignment is achieved, a user may slide thumbstick top 3002 onto thumbstick base 3004. This will have the effect of deflecting first and second ball detents 3014 and 3016 back into the top surface of circular stem 3012. Then, by applying a horizontal and counterclockwise quarter-turn to thumbstick top 3002 (which is permitted by the shape of cavity 3102), one of first ball detent 3014 and second ball detent 3016 will be brought into alignment with and snap into first circular concavity 3104 and the other one of first ball detent 3014 and second ball detent 3016 will be brought into alignment with and snap into second circular concavity 3106. The snapping of first and second ball detents 3014 and 3016 into corresponding ones of first and second circular concavities 3104 and 3016 will help secure thumbstick top 3002 to thumbstick base 3004. This snapping may also be sensed (e.g., heard or felt) by the user and thereby indicate to the user that a secure connection has been achieved.

Figure 32:
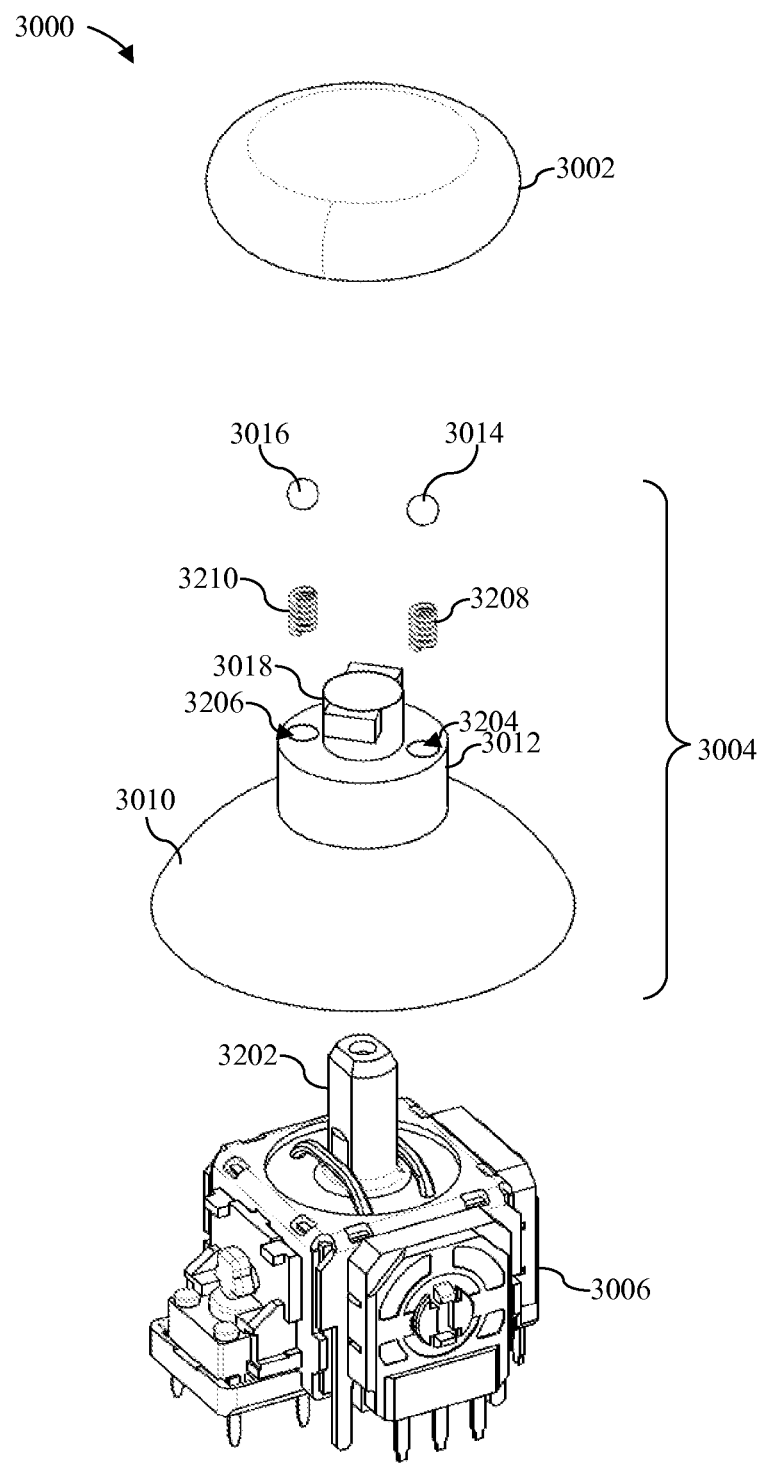
FIG. 32 shows an exploded view of the thumbstick of FIG. 30.

FIG. 32 shows an exploded view of thumbstick 3000. As shown in FIG. 32, thumbstick module 3006 includes a moveable post 3202 upon which dome-shaped component 3010 is mounted. Thumbstick module 3006 and moveable post 3202 operate in a substantially similar manner to thumbstick module 520 and moveable post 710 as described above in reference to game controller 200.

As also shown in FIG. 32, a first hole 3204 and a second hole 3206 are formed in the top surface of cylindrical stem 3012 of dome-shaped component 3010. A first spring 3208 is disposed in first hole 3204 and first ball detent 3014 is disposed on first spring 3208. First spring 3208 biases first ball detent 3014 to project out of first hole 3204 and also allows first ball detent 3014 to be deflected into first hole 3204 when a downward force is applied to first ball detent 3014. A second spring 3210 is disposed in second hole 3206 and second ball detent 3016 is disposed on second spring 3210. Second spring 3210 biases second ball detent 3016 to project out of second hole 3206 and also allows second ball detent 3016 to be deflected into second hole 3206 when a downward force is applied to second ball detent 3016. It is noted that in an alternate embodiment, first ball detent 3014 and second ball detent 3016 may be replaced with deformable convex protuberances formed in the top surface of cylindrical stem 3012.

Figure 33:
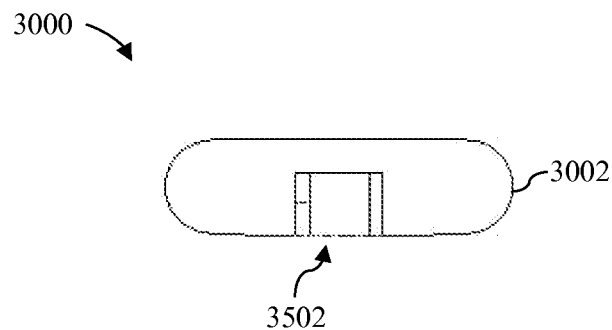
FIG. 33 shows a cross-sectional view of the thumbstick of FIG. 30 in which the thumbstick top is disconnected from the thumbstick base.
Figure 33:
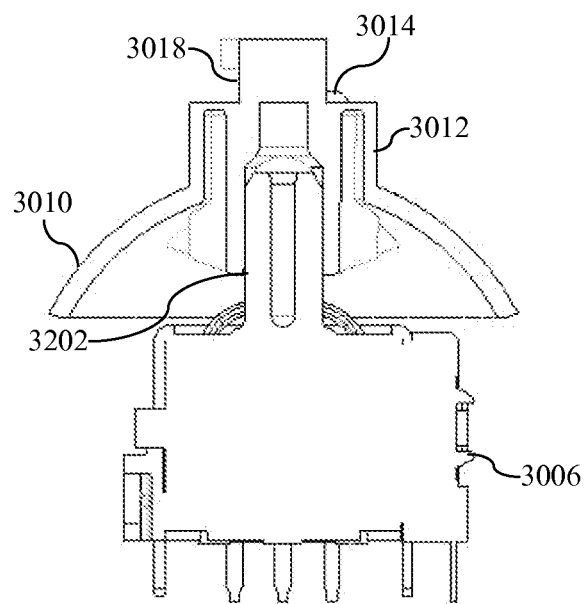
Figure 34:
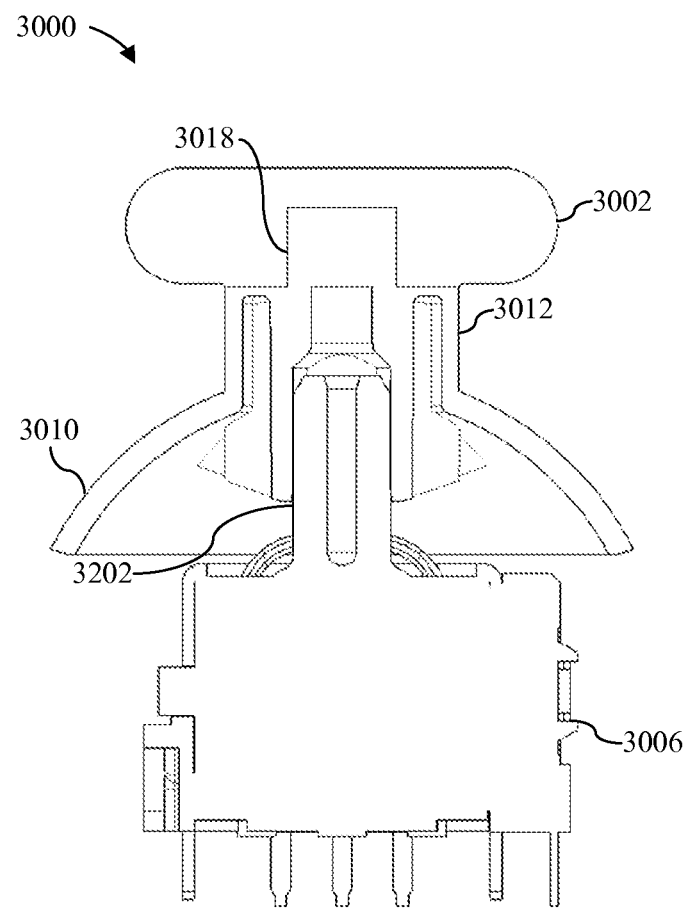
FIG. 34 shows a cross-sectional view of the thumbstick of FIG. 30 in which the thumbstick top is connected to the thumbstick base.

FIG. 33 shows a cross-sectional view of thumbstick 3000 in which thumbstick top 3002 is disconnected from thumbstick base 3004. FIG. 34 shows a cross-sectional view of thumbstick 3000 in which thumbstick top 3402 is connected to thumbstick base 3404.

In the connected state shown in FIG. 34, the rigid protrusions that extend from cylindrical post 3018 are locked within an enclosed portion of cavity 3102. Such an arrangement will thus prevent thumbstick top 3002 from being drawn up and off of thumbstick base 3004. Furthermore, each of first ball detent 3014 and second ball detent 3016 is snapped into a corresponding one of first circular concavity 3104 and second circular concavity 3106. This feature helps to prevent thumbstick cap 3002 from wobbling or rotating while thumbstick cap 3002 is connected to thumbstick base 3004 and is being manipulated by a user.

To remove thumbstick top 3002 from thumbstick base 3004, a user can apply a force to rotate thumbstick cap 3002 90° (a quarter-turn) horizontally and in a clockwise direction and then pull upward thereon. The force applied in turning thumbstick cap 3002 must be sufficient to deflect first and second ball detents 3014 and 3016 back into the top surface of cylindrical stem 3014. In embodiments, such removal of thumbstick top 3002 from thumbstick base 3004 can be achieved manually without the use of any tools.

In another embodiment, a connection method based on threaded fasteners is used to removably connect a thumbstick top to a thumbstick base. In accordance with one such embodiment, a thumbstick top comprises a head and a cylindrical stem that extends perpendicularly from a bottom surface of the head. The cylindrical stem defines a cylindrical internal cavity with an open end that is opposite the bottom surface of the head. An inner wall of the cylindrical stem that surrounds the cylindrical internal cavity has a first threaded surface. The thumbstick base comprises a cylindrical post having an outer wall that has a second threaded surface. The thumbstick top may be removably connected to the thumbstick base by placing the open end of the cylindrical internal cavity defined by the thumbstick top over the cylindrical post of the thumbstick base and twisting the thumbstick top, thereby causing the first threaded surface to mate with the second threaded surface. This has the effect of removably connecting the thumbstick top to the thumbstick base.

In accordance with another threaded fastener embodiment, a thumbstick top comprises a head and a cylindrical stem that extends perpendicularly from a bottom surface of the head. An outer wall of the cylindrical stem comprises a first threaded surface. The thumbstick base defines a cylindrical depression or socket having an inner wall with a second threaded surface. The thumbstick top may be removably connected to the thumbstick base by placing the stem of the thumbstick top into the socket and then twisting the thumbstick top, thereby causing the first threaded surface to mate with the second threaded surface. This has the effect of removably connecting the thumbstick top to the thumbstick base.

The foregoing embodiments provide only a few examples of a manner in which a thumbstick cap may be removably connected to a thumbstick base. Such examples are by no means intended to be limiting. As was previously noted, a variety of alternate mechanisms may be used to implement such a connection. Moreover, various combinations of any of the aforementioned connection techniques (e.g., magnet to ferromagnetic material connections, magnet to magnet connections, wedge-based connections, quarter-turn fasteners that utilize spring clips, deflecting hooks or ball detents, threaded fasteners, or the like) may be utilized to removably connect a thumbstick top to a thumbstick base in accordance with embodiments.

In the embodiment described above in reference to FIGS. 2-10, ring magnet 704 is disposed in dome-shaped component 510 of thumbstick base 248. In accordance with an alternate embodiment, a magnet other than a ring magnet may be disposed in the thumbstick base to facilitate a magnetic connection with a ferromagnetic material in the thumbstick top. For example, a plurality of small cylinder magnets may be disposed in a recess in the thumbstick base (e.g., a recess similar to recess 802 in dome-shaped component 510). As another example, a diametrically-magnetized cylinder magnet may be included in the thumbstick base (e.g., housed in a post of the thumbstick base). As yet another example, a cylinder magnet may be included in the thumbstick base (e.g., housed in a post of the thumbstick base). In further accordance with this particular example, the thumbstick top may comprise a non-ferrous stem that defines an open-ended cylindrical cavity and a plate made of a ferromagnetic material that is disposed at a closed end of the open-ended cylindrical cavity. Still other types of magnets and magnet-based interconnection schemes may be used.

In the embodiment described above in reference to FIGS. 2-10, a magnetic connection between thumbstick top 250 and thumbstick base 248 is achieved by including a ferromagnetic material in thumbstick top 250 and a magnet in thumbstick base 248. In the embodiments described above in reference to FIGS. 11-15, a magnetic connection between thumbstick top 1102 and thumbstick base 1104 is achieved by including a first magnet in thumbstick base 1104 and a second magnet in thumbstick top 1102. In an alternative embodiment, a magnetic connection between a thumbstick top and a thumbstick base may be achieved by including a magnet in the thumbstick top and a ferromagnetic material in the thumbstick base.

In the embodiment described above in reference to FIGS. 16-22, thumbstick top 1602 comprises a cylindrical stem 1620 from which first protuberance 1632 and second protuberance 1906 extend. As noted above, each of first protuberance 1632 and second protuberance 1906 is generally shaped like a rectangular prism and has a dimple formed therein. The dimple is configured to engage with a corresponding one of first convex projection 1806 and second convex projection 1808 formed on the inner surface of spring clip 1804. It is noted that, in an alternate embodiment, the dimples may be formed directly on the cylindrical stem of the thumbstick top, such that no protuberances are needed.

In the embodiment described above in reference to FIGS. 30-34, the stem (or "stalk") of the thumbstick cap comprises a fixed part of the thumbstick base. It is noted that a wide variety of other designs may be used in which the stem between the thumbstick top and the thumbstick base is fixedly attached to thumbstick base as opposed to the thumbstick top.

In each of the embodiments described above in reference to FIGS. 2-34, a dome-shaped component of the thumbstick base is configured to be mounted on top of a moveable post of the thumbstick module. An interference fit and/or adhesive may also be used to connect the two components. However, in alternate embodiments, a different mechanism may be used to interconnect the two components. Moreover, in certain embodiments, the moveable post of the thumbstick module and the dome-shaped component of the thumbstick base may be formed as a single, integrated part.

In a further alternative embodiment, an interference or press fit attachment mechanism may be used to removably connect a thumbstick top to a thumbstick base. As will be appreciated by persons skilled in the relevant art(s), such a mechanism achieves fastening between the thumbstick top and the thumbstick base by ensuring that there is friction between the two components after the two parts are pushed together.

In another alternative embodiment, a bayonet attachment mechanism may be used to removably connect a thumbstick top to a thumbstick base. As will be appreciated by persons skilled in the art, a bayonet attachment mechanism may consist of a cylindrical male side with one or more radial pins, and a female receptor with matching L-shaped slot(s) and with spring(s) to keep the two parts locked together. The slots may be shaped like a capital letter L with a serif (a short upward segment at the end of the horizontal arm of the L). In accordance with such a design, each pin slides into a vertical arm of a corresponding L, rotates across a horizontal arm of the corresponding L, and is then pushed slightly upwards into the short vertical serif by the spring. In this state, the connector is no longer free to rotate unless pushed down against the spring until the pin is out of the serif. To disconnect, the two parts are pushed together to move the pin out of the serif while twisting in the opposite direction than for connecting, and then pulled apart. Still other variants of a bayonet attachment mechanism may be utilized.

Any of a wide variety of snap-fit features may also be used to implement a removable connection between a thumbstick top and a thumbstick base in accordance with various embodiments. For example, in accordance with certain embodiments, elastic snap-fit attachment mechanisms may be used, such as but not limited to: window snaps, annular snaps, leaf-spring snaps, ball-and-socket snaps, post-and-dome snaps, compression hooks, cantilever hooks, compression traps and beams, bayonet-finger snaps and torsion snaps.

The foregoing example game controllers and associated removable thumbstick tops have been presented herein by way of example only and are not intended to be limiting. For example, the concepts described herein are not limited to game controllers of the type shown (e.g., gamepad type controllers that are designed to be held in two hands) but are equally applicable to any type of game controller that includes a user-manipulable thumbstick or joystick. Furthermore, the concepts described herein apply to game controllers that are separate from a computer, video game console, or other platform that they are designed to interact with as well as to game controllers that are integrated with such platforms (e.g., game controllers that form an integrated part of a handheld gaming console).

Additionally, the concepts described herein are not limited to game controllers but are equally applicable to any type of user input device that utilizes joystick-type technology, including but by no means limited to user input devices for cockpit flight controls, remotely controlled aircraft, vehicles, robots, and toys, and industrial and manufacturing applications such as cranes, assembly lines, forestry equipment, mining trucks, and excavators.

III. Additional Exemplary Embodiments

A user input device is described herein that includes a housing, a thumbstick module and a thumbstick cap. The housing defines an internal cavity of the user input device and includes an aperture. The thumbstick module is disposed within the internal cavity. The thumbstick module comprises a moveable post and is operable to generate an analog input control signal based on a position of the moveable post in relation to a default position. The thumbstick cap is connected to the thumbstick module. The thumbstick cap comprises a thumbstick base and a thumbstick top. The thumbstick base is connected to the moveable post of the thumbstick module and includes a portion that is externally accessible with respect to the housing through the aperture. The thumbstick top is removably connected to the externally-accessible portion of the thumbstick base. The thumbstick top is manipulable by a user to cause a displacement of the moveable post of the thumbstick module from the default position. The removable connection between the thumbstick cap and the thumbstick base enables the user to disconnect the thumbstick cap from the thumbstick base and reconnect the thumbstick cap to the thumbstick base without disassembling the housing.

In one embodiment of the foregoing user input device, the thumbstick base comprises a magnet and the thumbstick top comprises a ferromagnetic material that is attracted to the magnet. In further accordance with such an embodiment, the magnet may comprise a ring magnet, the thumbstick base may comprise a dome-shaped component having a top surface and a bottom surface, the top surface defining a circular depression and the bottom surface defining a circular recess that is vertically aligned with the circular depression and in which the ring magnet is disposed, and the thumbstick top comprises a cylindrical stem that comprises the ferromagnetic material and is inserted into the circular depression.

In another embodiment of the foregoing user input device, the thumbstick base comprises a cylindrical post having one or more tapered channels formed thereon, the thumbstick top comprises a stem that defines an open-ended cylindrical cavity, the stem having an inner wall that surrounds the open-ended cylindrical cavity and one or more wedge-shaped protrusions that extend from the inner wall, and each one of the one or more wedge-shaped protrusion is inserted into a corresponding one of the one or more tapered channels.

In yet another embodiment of the foregoing user input device, the thumbstick base comprises a first magnet and the thumbstick top comprises a second magnet that is attracted to the first magnet. In further accordance with such an embodiment, the thumbstick base may comprise a cylindrical post in which the first magnet is disposed, the thumbstick top may comprise a stem that defines an open-ended cylindrical cavity, the second magnet being disposed at a closed end of the open-ended cylindrical cavity, and the cylindrical post may be inserted into the open-ended cylindrical cavity.

In another embodiment of the foregoing user input device, the thumbstick top comprises a magnet and the thumbstick base comprises a ferromagnetic material that is attracted to the magnet.

In still another embodiment of the foregoing user input device, the thumbstick base defines a circular depression and comprises one or more wedge-shaped protrusions formed therein, the thumbstick top comprises a cylindrical stem having one or more tapered channels formed therein, and each of the one or more wedge-shaped protrusions is inserted into a corresponding one of the one or more tapered channels.

In a further embodiment of the foregoing user input device, the thumbstick base comprises a dome-shaped component and a spring clip. The dome-shaped component comprises a top surface and a bottom surface. The top surface defines a circular depression and one or more semicircular channels at a base of the circular depression. The bottom surface comprises a projection upon which the spring clip is mounted. The spring clip comprises one or more convex projections, each of the one or more convex projections extending into a corresponding one of the one or more semicircular channels. In further accordance with this embodiment, the thumbstick top comprises a cylindrical stem having one or more rigid protuberances extending therefrom. Each of the one or more rigid protuberances has a dimple formed thereon and has been conveyed via a turn of the thumbstick top through a corresponding one of the one or more semicircular channels such that the dimple formed thereon is engaged with a corresponding one of the one or more convex projections of the spring clip.

In a still further embodiment of the foregoing user device, the thumbstick base comprises a dome-shaped component and a dome-shaped shell that is disposed on top of the dome-shaped component. The dome-shaped component defines a circular depression. The dome-shaped shell comprises a collar that surrounds the circular depression. In further accordance with this embodiment, the thumbstick top comprises a cylindrical stem that is inserted through the collar and into the circular depression.

In another embodiment of the foregoing user device, the thumbstick base defines a circular depression and one or more semicircular channels at a base of the circular depression. In further accordance with this embodiment, the thumbstick top comprises a cylindrical stem having one or more semicircular arms extending therefrom. Each of the one or more semicircular arms has a knob formed at an end thereof and has been conveyed via a turn of the thumbstick top through a corresponding one of the one or more semicircular channels such that the semicircular arm is snapped into the corresponding one of the one or more semicircular channels.

In yet another embodiment of the foregoing user device, the thumbstick base defines a circular depression and one or more semicircular channels at a base of the circular depression. Each of the one or more semicircular channels is defined in part by a corresponding semicircular arm of the thumbstick base, each semicircular arm comprising a hook at an end thereof. In further accordance with this embodiment, the thumbstick top comprises a cylindrical stem having one or more rigid protrusions extending therefrom. Each of the one or more rigid protrusions has a notch formed thereon and has been conveyed via a turn of the thumbstick top through a corresponding one of the one or more semicircular channels such that the notch formed thereon engages with a hook at an end of the semicircular arm that partially defines the corresponding one of the one or more semicircular channels.

In still another embodiment of the foregoing user input device, the thumbstick base comprises a cylindrical stem, a post that extends from a top surface of the cylindrical stem and from which extend one or more rigid protrusions, and one or more ball detents that project from the top surface of the cylindrical stem. In further accordance with this embodiment, the thumbstick top comprises a surface in which an open-ended cavity and one or more circular concavities are formed. The open-ended cavity has been inserted over the cylindrical stem and the one or more rigid protrusions and the thumbstick top have been rotated such that each of the one or more ball detents is projected into a corresponding one of the one or more circular concavities.

In a further embodiment of the foregoing user input device, the thumbstick top comprises a stem that defines an open-ended cylindrical cavity and includes an inner wall that surrounds the open-ended cylindrical cavity and has a first threaded surface and the thumbstick base comprises a cylindrical post that comprises an outer wall that has a second threaded surface that is mated with the first threaded surface.

In a still further embodiment of the foregoing user input device, the thumbstick top comprises a cylindrical stem having an outer wall with a first threaded surface and the thumbstick base defines a cylindrical depression and includes an inner wall that surrounds that cylindrical depression and has a second threaded surface that is mated with the first threaded surface.

In another embodiment of the foregoing user input device, the thumbstick top is removably connected to the thumbstick base via a press-fit attachment mechanism.

In yet another embodiment of the foregoing user input device, the thumbstick top is removably connected to the thumbstick base via a bayonet attachment mechanism.

A thumbstick for a user input device is also described herein that includes a thumbstick module and a thumbstick cap that is connected to the thumbstick module. The thumbstick module comprises a moveable post and is operable to generate an analog input control signal based on a position of the moveable post in relation to a default position. The thumbstick cap comprises a thumbstick base and a thumbstick top. The thumbstick base is connected to the moveable post of the thumbstick module. The thumbstick top is removably connected to the thumbstick base and is manipulable by a user to cause a displacement of the moveable post of the thumbstick module from the default position. The removable connection between the thumbstick cap and the thumbstick base enables the user to disconnect the thumbstick cap from the thumbstick base and reconnect the thumbstick cap to the thumbstick base without using any tools.

In one embodiment of the foregoing thumbstick, the thumbstick base comprises a magnet and the thumbstick top comprises a ferromagnetic material that is attracted to the magnet. In further accordance with this embodiment, the magnet may comprise a ring magnet, the thumbstick base may comprise a dome-shaped component having a top surface and a bottom surface, the top surface defining a circular depression and the bottom surface defining a circular recess that is vertically aligned with the circular depression and in which the ring magnet is disposed, and the thumbstick top may comprise a cylindrical stem that comprises the ferromagnetic material and is inserted into the circular depression. In further accordance with this embodiment, the thumbstick base may further comprise a metal shield that blocks at least a portion of a magnetic field created by the magnet.

In another embodiment of the foregoing thumbstick, the thumbstick base comprises a cylindrical post having one or more tapered channels formed thereon, the thumbstick top comprises a stem that defines an open-ended cylindrical cavity, the stem having an inner wall that surrounds the open-ended cylindrical cavity and one or more wedge-shaped protrusions that extend from the inner wall, and each of the one or more wedge-shaped protrusions is inserted into a corresponding one of the one or more tapered channels.

Another user input device is described herein that comprises a housing, a thumbstick module and a thumbstick base. The housing defines an internal cavity of the user input device and includes an aperture. The thumbstick module is disposed within the internal cavity. The thumbstick module comprises a moveable post and is operable to generate an analog input control signal based on a position of the moveable post in relation to a default position. The thumbstick base is connected to the moveable post of the thumbstick module and includes a portion that is externally accessible with respect to the housing through the aperture. The externally-accessible portion of the thumbstick base comprises one or more first mating elements. The one or more first mating elements are configured to removably connect to one or more second mating elements of a thumbstick top. The removable connection of the one or more first mating elements to the one or more second mating elements enables the thumbstick top to be removably connected to the thumbstick base.

A thumbstick top is also described herein. The thumbstick top comprises a head and a stem. The head has a first surface and a second surface that is opposite to the first surface, the first surface being adapted to be manipulated by a user. The stem extends perpendicularly from the second surface. The stem comprises one or more first mating elements that are adapted to mate with one or more corresponding second mating elements of a thumbstick base of a user input device. The first and second mating elements are configured to enable the thumbstick top to be removably connected to the thumbstick base.

In one embodiment of the foregoing thumbstick top, the thumbstick top comprises a ferromagnetic material that is attracted to a magnet disposed in the thumbstick base. In further accordance with such an embodiment, the thumbstick top may comprise a cylindrical stem that comprises the ferromagnetic material and is configured to be inserted into a circular depression formed in the thumbstick base and the magnet may comprise a ring magnet that is vertically aligned with the circular depression.

In another embodiment of the foregoing thumbstick top, the stem defines an open-ended cylindrical cavity and includes an inner wall that surrounds the open-ended cylindrical cavity, the one or more first mating elements comprise one or more wedge-shaped protrusions that extend from the inner wall, and the one or more second mating elements comprise one or more tapered channels formed on a cylindrical post of the thumbstick base.

In yet another embodiment of the foregoing thumbstick top, the thumbstick top comprises a first magnet that is attracted to a second magnet disposed in the thumbstick base. In further accordance with such an embodiment, the first magnet may be disposed at a closed end of an open-ended cylindrical cavity defined by the stem, the open-ended cylindrical cavity being configured to be mounted upon a cylindrical post of the thumbstick base in which the second magnet is disposed.

In still another embodiment of the foregoing thumbstick top, the one or more first mating elements comprise one or more tapered channels formed in the stem and the one or more second elements comprise one or more wedge-shaped protrusions formed in a circular depression of the thumbstick base.

In another embodiment of the foregoing thumbstick top, the thumbstick top comprises a magnet and the thumbstick base comprises a ferromagnetic material that is attracted to the magnet.

In a further embodiment of the foregoing thumbstick top, the one or more first mating elements comprise one or more rigid protuberances that extend from the stem, each of the one or more rigid protuberances having a dimple formed thereon. In further accordance with this embodiment, the one or more second mating elements comprise one or more convex projections formed on a spring clip of the thumbstick base. Each dimple of each rigid protuberance of the thumbstick top is configured to engage with a corresponding convex projection formed on the spring clip of the thumbstick base after rotation of each rigid protuberance of the thumbstick top through a corresponding semicircular channel of the thumbstick base.

In a still further embodiment of the foregoing thumbstick top, the one or more first mating elements comprise one or more semicircular arms that extend from the stem. Each of the one or more semicircular arms has a knob formed at an end thereof. In further accordance with this embodiment, the one or more second mating elements comprise one or more semicircular channels formed at a base of a circular depression of the thumbstick base. Each semicircular channel is configured to engage a corresponding one of the one or more semicircular arms after rotation of the corresponding semicircular arm through the semicircular channel.

In another embodiment of the foregoing thumbstick top, the one or more first mating elements comprise one or more rigid protrusions that extend from the stem, each of the one or more rigid protrusions having a notch formed thereon. In further accordance with this embodiment, the one or more second mating elements comprise one or more semicircular channels formed at a base of a circular depression of the thumbstick base. Each of the one or more semicircular channels is defined in part by a corresponding semicircular arm of the thumbstick base. Each semicircular arm comprises a hook at an end thereof. In still further accordance with this embodiment, each notch formed on each of the one or more rigid protrusions is configured to engage with a hook of a corresponding one of the one or more semicircular arms after rotation of each of the one or more semicircular arms through a corresponding one of the one or more semicircular channels.

In yet another embodiment of the foregoing thumbstick top, the stem defines an open-ended cylindrical cavity and includes an inner wall that surrounds the open-ended cylindrical cavity, the one or more first mating elements comprise a first threaded surface formed on the inner wall, and the one or more second mating elements comprise a second threaded surface formed on an outer wall of a cylindrical post of the thumbstick base.

In still another embodiment of the foregoing thumbstick top, the one or more first mating elements comprise a first threaded surface formed on an outer wall of the stem and the one or more second mating elements comprise a second threaded surface formed on an inner wall that surrounds a circular depression of the thumbstick base.

In a further embodiment of the foregoing thumbstick top, each of the one or more first mating elements is adapted to connect to a corresponding one of the one or more second mating elements via a press-fit attachment mechanism.

In a still further embodiment of the foregoing thumbstick top, each of the one or more first mating elements is adapted to connect to a corresponding one of the one or more second mating elements via a bayonet attachment mechanism.

Another thumbstick top is described herein. The thumbstick top comprises a head having a first surface and a second surface that is opposite to the first surface. The first surface is adapted to be manipulated by a user. The second surface comprises one or more first mating elements that are adapted to mate with one or more corresponding second mating elements of a thumbstick base of a user input device. The first and second mating elements are configured to enable the thumbstick top to be removably connected to the thumbstick base.

In one embodiment of the foregoing thumbstick top, the one or more first mating elements comprise an open-ended cavity and one or more circular concavities that are formed in the second surface of the head. In further accordance with this embodiment, the one or more second mating elements comprise a post that extends from a top surface of a cylindrical stem of the thumbstick base, the post having one or more rigid protrusions that extend therefrom, and one or more ball detents that project from the top surface of the cylindrical stem. The one or more circular concavities are configured to engage a corresponding one of the one or more ball detents after the open-ended cavity of the head is inserted over the post and the one or more rigid protrusions and the head is rotated.

A replaceable thumbstick top for a game controller is also described herein. The replaceable thumbstick top comprises a head and a cylindrical stem. The head has a top surface and a bottom surface that is opposite the top surface. The top surface is adapted to be manipulated by a user. The cylindrical stem extends perpendicularly from the bottom surface of the head. The cylindrical stem comprises one or more first mating elements that are adapted to mate with one or more corresponding second mating elements of a thumbstick base of the game controller. The first and second mating elements are configured to enable the thumbstick top to be removably connected to the thumbstick base without the use of any tools.

In one embodiment of the foregoing replaceable thumbstick top, the replaceable thumbstick top comprises a ferromagnetic material that is attracted to a magnet disposed in the thumbstick base. In further accordance with such an embodiment, the cylindrical stem may comprise the ferromagnetic material that is attracted to the magnet and may be configured to be inserted into a circular depression formed in the thumbstick base and the magnet may comprise a ring magnet that is vertically aligned with the circular depression.

In another embodiment of the foregoing replaceable thumbstick top, the cylindrical stem defines an open-ended cylindrical cavity and includes an inner wall that surrounds the cylindrical cavity, the one or more first mating elements comprise one or more wedge-shaped protrusions that extend from the inner wall, and the one or more second mating elements comprise one or more tapered channels formed on a cylindrical post of the thumbstick base.

In yet another embodiment of the foregoing replaceable thumbstick, the replaceable thumbstick top comprises a first magnet that is attracted to a second magnet disposed in the thumbstick base. In further accordance with such an embodiment, the first magnet may be disposed at a closed end of an open-ended cylindrical cavity defined by the cylindrical stem, the open-ended cylindrical cavity being configured to be mounted upon a cylindrical post of the thumbstick base in which the second magnet is disposed.

IV. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A thumbstick top, comprising:
a head having a first surface and a second surface that is opposite to the first surface, the first surface being adapted to be manipulated by a user; and
a cylindrical stem that extends perpendicularly from the second surface, the cylindrical stem comprising one or more first mating elements that are adapted to mate with one or more corresponding second mating elements of a thumbstick base of a user input device, the first and second mating elements being configured to enable the thumbstick top to be removably connected to the thumbstick base, the cylindrical stem further comprising a ferromagnetic material that is attracted to a magnet disposed in the thumbstick base and configured to be inserted into a circular depression formed in the thumbstick base, the magnet comprising a ring magnet that is vertically aligned with the circular depression.

2. The thumbstick top of claim 1, wherein:
the cylindrical stem defines an open-ended cylindrical cavity and includes an inner wall that surrounds the open-ended cylindrical cavity;
the one or more first mating elements comprise one or more wedge-shaped protrusions that extend from the inner wall; and
the one or more second mating elements comprise one or more tapered channels formed on a cylindrical post of the thumbstick base.

3. The thumbstick top of claim 1, wherein the thumbstick top comprises a first magnet that is attracted to the ring magnet disposed in the thumbstick base.

4. A thumbstick top, comprising:
a head having a first surface and a second surface that is opposite to the first surface, the first surface being adapted to be manipulated by a user;
a stem that extends perpendicularly from the second surface, the stem comprising one or more first mating elements that are adapted to mate with one or more corresponding second mating elements of a thumbstick base of a user input device, the first and second mating elements being configured to enable the thumbstick top to be removably connected to the thumbstick base; and
a first magnet that is attracted to a second magnet disposed in the thumbstick base, the first magnet being disposed at a closed end of an open-ended cylindrical cavity defined by the stem, the open-ended cylindrical cavity being configured to be mounted upon a cylindrical post of the thumbstick base in which the second magnet is disposed.

5. The thumbstick top of claim 1, wherein the one or more first mating elements comprise one or more tapered channels formed in the cylindrical stem and the one or more second elements comprise one or more wedge-shaped protrusions formed in the circular depression of the thumbstick base.

6. The thumbstick top of claim 1, wherein:
the cylindrical stem defines an open-ended cylindrical cavity and includes an inner wall that surrounds the open-ended cylindrical cavity;
the one or more first mating elements comprise a first threaded surface formed on the inner wall; and
the one or more second mating elements comprise a second threaded surface formed on an outer wall of a cylindrical post of the thumbstick base.

7. The thumbstick cap of claim 1, wherein:
the one or more first mating elements comprise a first threaded surface formed on an outer wall of the cylindrical stem; and
the one or more second mating elements comprise a second threaded surface formed on an inner wall that surrounds a circular depression of the thumbstick base.

8. The thumbstick cap of claim 1, wherein each of the one or more first mating elements is adapted to connect to a corresponding one of the one or more second mating elements via a press-fit attachment mechanism.

9. The thumbstick cap of claim 1, wherein each of the one or more first mating elements is adapted to connect to a corresponding one of the one or more second mating elements via a bayonet attachment mechanism.

10. A thumbstick top, comprising:
a head having a first surface and a second surface that is opposite to the first surface, the first surface being adapted to be manipulated by a user; and
a stem that extends perpendicularly from the second surface, the stem comprising one or more first mating elements that are adapted to mate with one or more corresponding second mating elements of a thumbstick base of a user input device, the first and second mating elements being configured to enable the thumbstick top to be removably connected to the thumbstick base, the one or more first mating elements comprising one or more rigid protuberances that extend from the stem, each of the one or more rigid protuberances having a dimple formed thereon, the one or more second mating elements comprising one or more convex projections formed on a spring clip of the thumbstick base, each dimple of each rigid protuberance of the thumbstick top being configured to engage with a corresponding convex projection formed on the spring clip of the thumbstick base after rotation of each rigid protuberance of the thumbstick top through a corresponding semicircular channel of the thumbstick base.

11. A thumbstick top, comprising:
a head having a first surface and a second surface that is opposite to the first surface, the first surface being adapted to be manipulated by a user; and
a stem that extends perpendicularly from the second surface, the stem comprising one or more first mating elements that are adapted to mate with one or more corresponding second mating elements of a thumbstick base of a user input device, the first and second mating elements being configured to enable the thumbstick top to be removably connected to the thumbstick base, the one or more first mating elements comprising one or more semicircular arms that extend from the stem, each of the one or more semicircular arms having a knob formed at an end thereof and the one or more second mating elements comprising one or more semicircular channels formed at a base of a circular depression of the thumbstick base, each semicircular channel being configured to engage a corresponding one of the one or more semicircular arms after rotation of the corresponding semicircular arm through the semicircular channel.

12. A thumbstick top, comprising:
a head having a first surface and a second surface that is opposite to the first surface, the first surface being adapted to be manipulated by a user; and
a stem that extends perpendicularly from the second surface, the stem comprising one or more first mating elements that are adapted to mate with one or more corresponding second mating elements of a thumbstick base of a user input device, the first and second mating elements being configured to enable the thumbstick top to be removably connected to the thumbstick base, the one or more first mating elements comprising one or more rigid protrusions that extend from the stem, each of the one or more rigid protrusions having a notch formed thereon, the one or more second mating elements comprising one or more semicircular channels formed at a base of a circular depression of the thumbstick base, each of the one or more semicircular channels being defined in part by a corresponding semicircular arm of the thumbstick base, each semicircular arm comprising a hook at an end thereof, and each notch formed on each of the one or more rigid protrusions being configured to engage with a hook of a corresponding one of the one or more semicircular arms after rotation of each of the one or more semicircular arms through a corresponding one of the one or more semicircular channels.

13. A thumbstick top, comprising:
a head having a first surface and a second surface that is opposite to the first surface, the first surface being adapted to be manipulated by a user and the second surface comprising one or more first mating elements that are adapted to mate with one or more corresponding second mating elements of a thumbstick base of a user input device, the first and second mating element being configured to enable the thumbstick top to be removably connected to the thumbstick base, the one or more first mating elements comprising an open-ended cavity and one or more circular concavities that are formed in the second surface of the head, the one or more second mating elements comprising a post that extends from a top surface of a cylindrical stem of the thumbstick base, the post having one or more rigid protrusions that extend therefrom, and one or more ball detents that project from the top surface of the cylindrical stem, the one or more circular concavities being configured to engage a corresponding one of the one or more ball detents after the open-ended cavity of the head is inserted over the post and the one or more rigid protrusions and the head is rotated.

14. A replaceable thumbstick top for a game controller, comprising:
a head having a top surface and a bottom surface that is opposite the top surface, the top surface being adapted to be manipulated by a user; and
a cylindrical stem that extends perpendicularly from the bottom surface, the cylindrical stem comprising one or more first mating elements that are adapted to mate with one or more corresponding second mating elements of a thumbstick base of the game controller, the first and second mating elements being configured to enable the thumbstick top to be removably connected to the thumbstick base without the use of any tools, the cylindrical stem comprising a ferromagnetic material that is attracted to a magnet disposed in the thumbstick base and configured to be inserted into a circular depression formed in the thumbstick base, the magnet comprising a ring magnet that is vertically aligned with the circular depression.

15. The replaceable thumbstick top of claim 14, wherein:
the cylindrical stem defines an open-ended cylindrical cavity and includes an inner wall that surrounds the cylindrical cavity;
the one or more first mating elements comprise one or more wedge-shaped protrusions that extend from the inner wall; and
the one or more second mating elements comprise one or more tapered channels formed on a cylindrical post of the thumbstick base.

16. The replaceable thumbstick of claim 14, wherein the replaceable thumbstick top comprises a first magnet that is attracted to the ring magnet disposed in the thumbstick base.

17. A replaceable thumbstick top for a game controller, comprising:
a head having a top surface and a bottom surface that is opposite the top surface, the top surface being adapted to be manipulated by a user; and
a cylindrical stem that extends perpendicularly from the bottom surface, the cylindrical stem comprising one or more first mating elements that are adapted to mate with one or more corresponding second mating elements of a thumbstick base of the game controller, the first and second mating elements being configured to enable the thumbstick top to be removably connected to the thumbstick base without the use of any tools, the replaceable thumbstick top comprising a first magnet that is attracted to a second magnet disposed in the thumbstick base, the first magnet being disposed at a closed end of an open-ended cylindrical cavity defined by the cylindrical stem, the open-ended cylindrical cavity being configured to be mounted upon a cylindrical post of the thumbstick base in which the second magnet is disposed.

18. A thumbstick top, comprising:
a head having a first surface and a second surface that is opposite to the first surface, the first surface being adapted to be manipulated by a user; and
a cylindrical stem that extends perpendicularly from the second surface, the cylindrical stem comprising one or more first mating elements that are adapted to mate with one or more corresponding second mating elements of a thumbstick base of a user input device, the first and second mating elements being configured to enable the thumbstick top to be removably connected to the thumbstick base, the cylindrical stem further comprising a ferromagnetic material that is attracted to a ring magnet disposed in the thumbstick base and configured to be inserted into a circular depression formed in the thumbstick base, the circular depression having an outer boundary that is positioned vertically above a recess in which the ring magnet is disposed.

19. The thumbstick top of claim 18, wherein:
the cylindrical stem defines an open-ended cylindrical cavity and includes an inner wall that surrounds the open-ended cylindrical cavity;
the one or more first mating elements comprise one or more wedge-shaped protrusions that extend from the inner wall; and
the one or more second mating elements comprise one or more tapered channels formed on a cylindrical post of the thumbstick base.

20. The thumbstick top of claim 18, wherein the thumbstick top comprises a first magnet that is attracted to the ring magnet disposed in the thumbstick base.

21. The thumbstick top of claim 18, wherein the one or more first mating elements comprise one or more tapered channels formed in the cylindrical stem and the one or more second elements comprise one or more wedge-shaped protrusions formed in the circular depression of the thumbstick base.

22. The thumbstick top of claim 18, wherein:
the cylindrical stem defines an open-ended cylindrical cavity and includes an inner wall that surrounds the open-ended cylindrical cavity;
the one or more first mating elements comprise a first threaded surface formed on the inner wall; and
the one or more second mating elements comprise a second threaded surface formed on an outer wall of a cylindrical post of the thumbstick base.

23. The thumbstick cap of claim 18, wherein:
the one or more first mating elements comprise a first threaded surface formed on an outer wall of the cylindrical stem; and
the one or more second mating elements comprise a second threaded surface formed on an inner wall that surrounds the circular depression of the thumbstick base.

24. The thumbstick cap of claim 18, wherein each of the one or more first mating elements is adapted to connect to a corresponding one of the one or more second mating elements via a press-fit attachment mechanism.

25. The thumbstick cap of claim 18, wherein each of the one or more first mating elements is adapted to connect to a corresponding one of the one or more second mating elements via a bayonet attachment mechanism.

26. A replaceable thumbstick top for a game controller, comprising:
a head having a top surface and a bottom surface that is opposite the top surface, the top surface being adapted to be manipulated by a user; and
a cylindrical stem that extends perpendicularly from the bottom surface, the cylindrical stem comprising one or more first mating elements that are adapted to mate with one or more corresponding second mating elements of a thumbstick base of the game controller, the first and second mating elements being configured to enable the thumbstick top to be removably connected to the thumbstick base without the use of any tools, the cylindrical stem comprising a ferromagnetic material that is attracted to a ring magnet disposed in the thumbstick base and configured to be inserted into a circular depression formed in the thumbstick base, the circular depression having an outer boundary that is positioned vertically above a recess in which the ring magnet is disposed.

27. The replaceable thumbstick top of claim 26, wherein:
the cylindrical stem defines an open-ended cylindrical cavity and includes an inner wall that surrounds the cylindrical cavity;
the one or more first mating elements comprise one or more wedge-shaped protrusions that extend from the inner wall; and
the one or more second mating elements comprise one or more tapered channels formed on a cylindrical post of the thumbstick base.

28. The replaceable thumbstick of claim 26, wherein the replaceable thumbstick top comprises a first magnet that is attracted to the ring magnet disposed in the thumbstick base.

* * * * *